US 9,854,083 B2

United States Patent
Yamada

(10) Patent No.: US 9,854,083 B2
(45) Date of Patent: *Dec. 26, 2017

(54) INFORMATION PROCESSING SYSTEM, INFORMATION PROCESSING APPARATUS, DEVICE CONTROL METHOD, AND MEDIUM

(71) Applicant: RICOH COMPANY, LTD., Tokyo (JP)

(72) Inventor: Kazuhiro Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 14/833,220

(22) Filed: Aug. 24, 2015

(65) Prior Publication Data

US 2016/0065718 A1 Mar. 3, 2016

(30) Foreign Application Priority Data

Sep. 2, 2014 (JP) .................................. 2014/177891

(51) Int. Cl.
*H04M 1/725* (2006.01)
*H04W 4/00* (2009.01)

(52) U.S. Cl.
CPC ....... *H04M 1/72533* (2013.01); *H04W 4/008* (2013.01)

(58) Field of Classification Search
CPC ....... H04N 2201/0039; H04N 1/00244; H04N 2201/3205; H04N 1/00233
See application file for complete search history.

(56) References Cited

U.S. PATENT DOCUMENTS

| 6,510,212 | B2 | 1/2003 | Ito et al. |
| 8,103,744 | B2 | 1/2012 | Yoshihara et al. |
| 8,115,943 | B2 * | 2/2012 | Ohishi ............... H04N 1/00238 358/1.15 |
| 2004/0130568 | A1 * | 7/2004 | Nagano ................. G06F 3/1454 715/733 |

(Continued)

FOREIGN PATENT DOCUMENTS

| JP | 2004-096591 | 3/2004 |
| JP | 2006-129184 | 5/2006 |

(Continued)

*Primary Examiner* — Dung Hong
(74) *Attorney, Agent, or Firm* — IPUSA, PLLC

(57) ABSTRACT

An information processing system includes at least two terminals connected with a first network; and an information processing apparatus (IPA) connected with a second network, and with the first network via a relay device. The first terminal obtains device information about devices on the second network, receives a selection among the devices, and transmits a request for outputting data on the selected device to the IPA. The second terminal obtains the device information, receives the selection of the device, transmits a request for obtaining data on the selected device to the IPA, and obtains the data output by the selected device. The IPA obtains the requests for the outputting and the obtaining, respectively, requests the selected device to execute the outputting and the obtaining, receives the data provided by the selected device, to provide it to the second terminal.

12 Claims, 23 Drawing Sheets

(56) References Cited

U.S. PATENT DOCUMENTS

| | | | | |
|---|---|---|---|---|
| 2004/0267981 | A1* | 12/2004 | Kakemura | G06F 13/38 710/48 |
| 2006/0098174 | A1* | 5/2006 | Ohuchi | H04M 3/567 353/122 |
| 2006/0294237 | A1* | 12/2006 | Nguyen | G06F 17/30905 709/225 |
| 2010/0265530 | A1* | 10/2010 | Takechi | G06F 21/608 358/1.14 |
| 2010/0265544 | A1* | 10/2010 | Anezaki | G06F 3/1204 358/1.15 |
| 2011/0194140 | A1* | 8/2011 | Sweet | G06F 3/1204 358/1.15 |
| 2012/0162687 | A1* | 6/2012 | Hattori | G06F 3/1204 358/1.13 |
| 2012/0250065 | A1* | 10/2012 | Partridge | G06F 21/608 358/1.14 |
| 2012/0287469 | A1* | 11/2012 | Tomiyasu | H04N 1/00244 358/1.15 |
| 2013/0067037 | A1* | 3/2013 | Yoshida | H04N 21/47202 709/219 |
| 2013/0083337 | A1* | 4/2013 | Tecu | G06F 3/1204 358/1.13 |
| 2013/0229690 | A1* | 9/2013 | Sumita | H04N 1/00127 358/1.15 |
| 2013/0335772 | A1* | 12/2013 | Waller | G06F 3/1288 358/1.15 |
| 2014/0016161 | A1 | 1/2014 | Yamada | |
| 2014/0016816 | A1 | 1/2014 | Yamada | |
| 2014/0185082 | A1 | 7/2014 | Yamada | |
| 2015/0015908 | A1* | 1/2015 | Tanaka | G06K 15/4095 358/1.14 |
| 2015/0080025 | A1 | 3/2015 | Yamada | |
| 2015/0082423 | A1 | 3/2015 | Yamada | |

FOREIGN PATENT DOCUMENTS

| | | |
|---|---|---|
| JP | 2006-203516 | 8/2006 |
| JP | 2006-244321 | 9/2006 |
| JP | 4359004 | 11/2009 |
| JP | 4589696 | 12/2010 |
| JP | 4600992 | 12/2010 |
| JP | 2011-244499 | 12/2011 |
| JP | 4868028 | 2/2012 |
| JP | 2014-014187 | 1/2014 |
| JP | 2014-016896 | 1/2014 |

* cited by examiner

FIG.8

| INFORMATION | | SETTING EXAMPLE |
|---|---|---|
| PROJECTOR | IP ADDRESS | 192.168.0.10 |
| | HOST NAME | PROJECTOR 1 |
| | MAC ADDRESS | 00-00-00-00-00-AA |
| | DEVICE TYPE | PJS1 |
| IWB | IP ADDRESS | 192.168.0.11 |
| | HOST NAME | IWB1 |
| | MAC ADDRESS | 00-00-00-00-00-AB |
| | DEVICE TYPE | IWB1 |
| MFP | IP ADDRESS | 192.168.0.12 |
| | HOST NAME | MFP1 |
| | MAC ADDRESS | 00-00-00-00-00-AC |
| | DEVICE TYPE | MFP1 |
| CONFERENCE ROOM | | room1 |

| INFORMATION | SETTING EXAMPLE |
|---|---|
| IP ADDRESS | 192.168.0.10 |
| HOST NAME | PROJECTOR 1 |
| MAC ADDRESS | 00-00-00-00-00-AA |
| DEVICE TYPE | PJS1 |
| CONFERENCE ROOM | room1 |

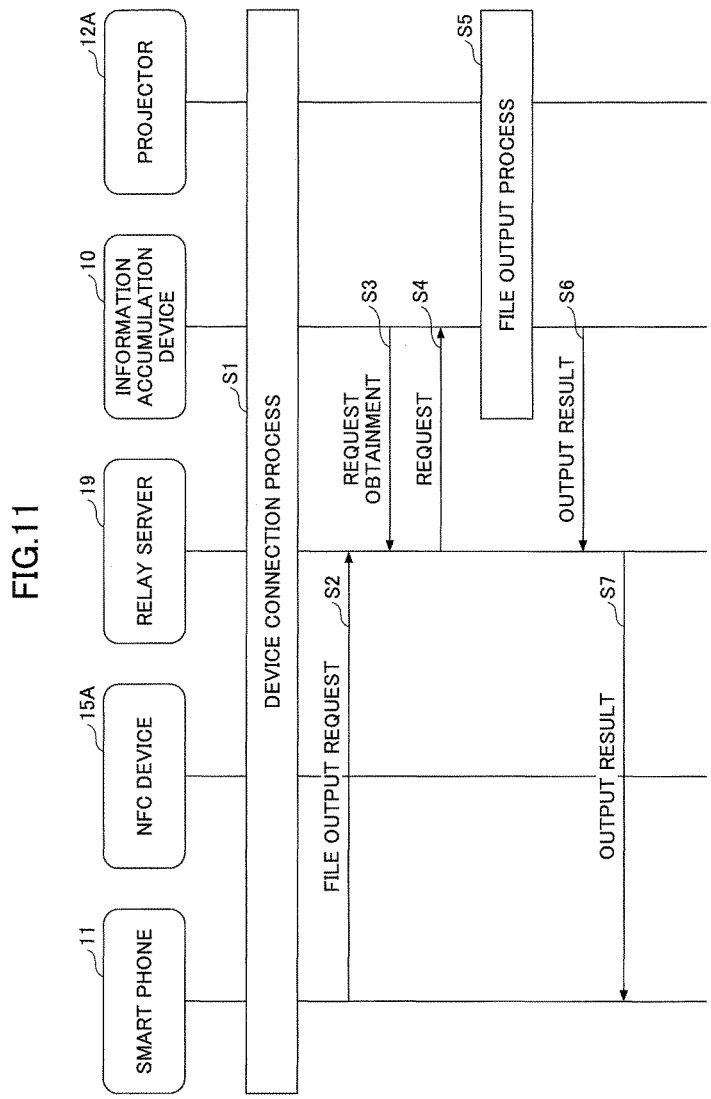

FIG.12

| INFORMATION | DESCRIPTION |
|---|---|
| INFORMATION ACCUMULATION DEVICE ID | ID TO IDENTIFY INFORMATION ACCUMULATION DEVICE |
| AUTHENTICATION INFORMATION OF INFORMATION ACCUMULATION DEVICE | AUTHENTICATION INFORMATION FOR ACCESSING INFORMATION ACCUMULATION DEVICE |
| DEVICE CONNECTION INFORMATION | IP ADDRESS AND HOST NAME TO ESTABLISH NETWORK CONNECTION WITH DEVICE |
| REQUEST COMMAND | REQUEST COMMAND TO EXECUTE IF PROVIDED BY DEVICE |

FIG.13

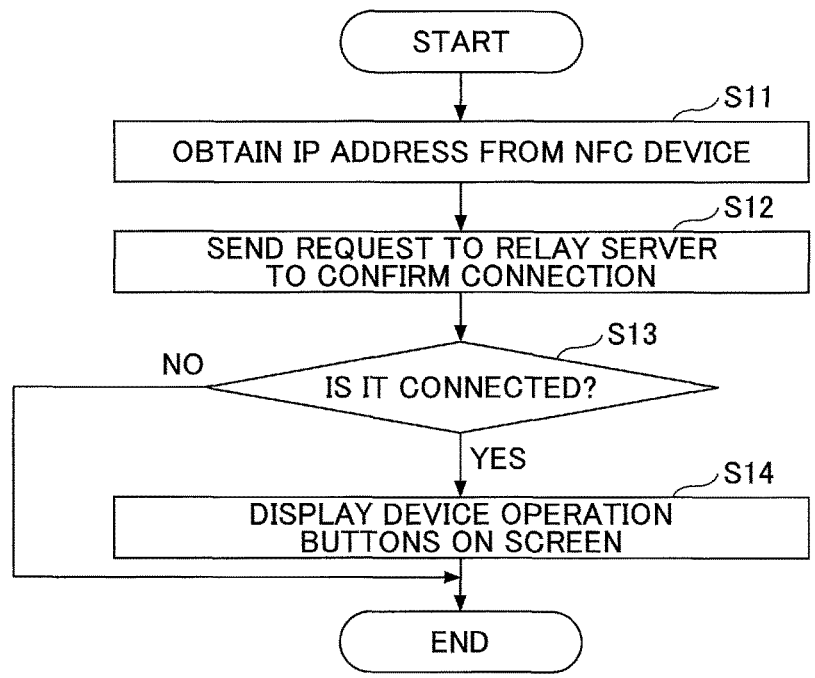

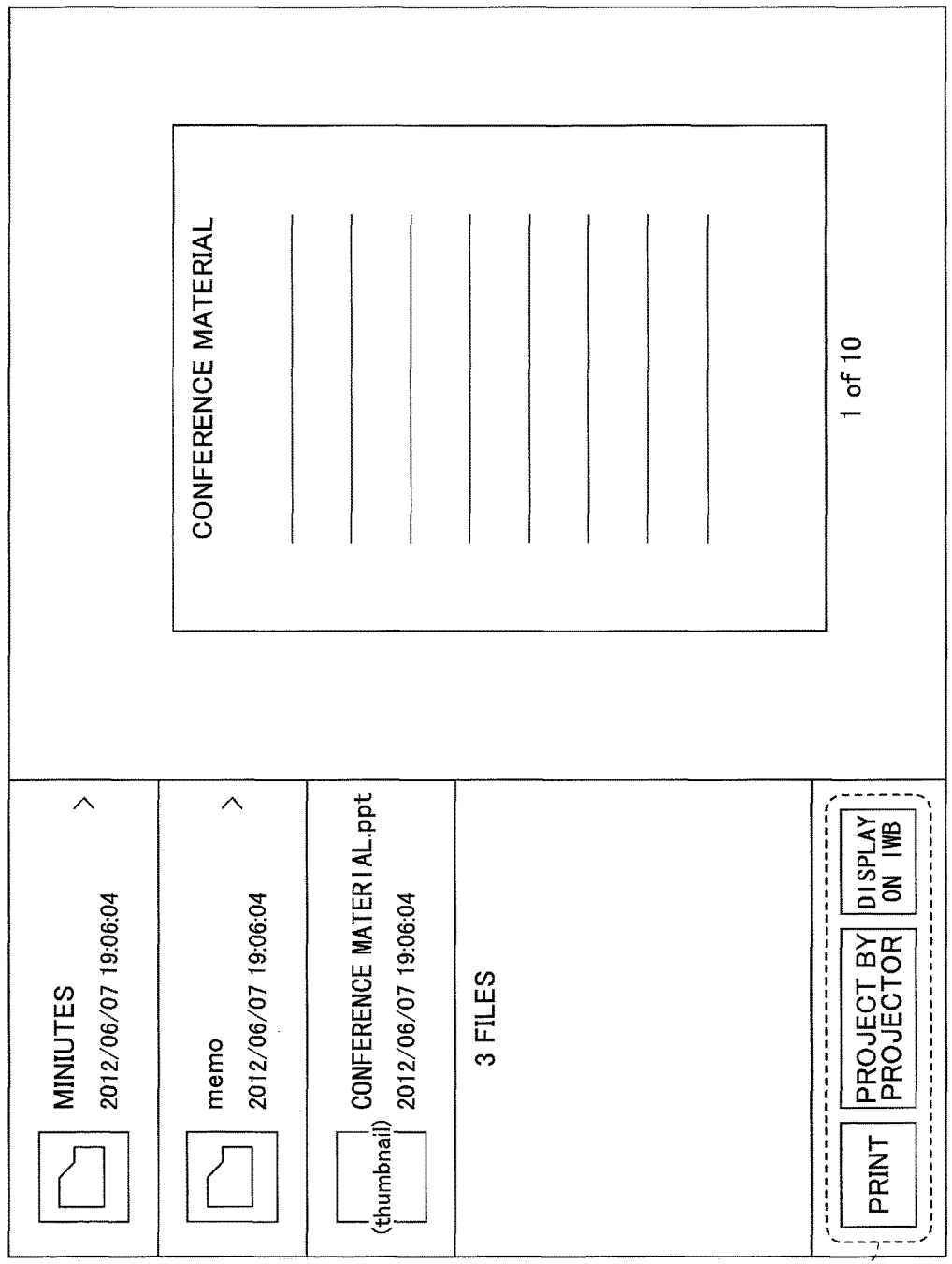

FIG.21

| DEVICE TYPE | OUTPUT TYPE | OBTAINEMENT TYPE |
|---|---|---|
| PJS1 | PROJECT BY PROJECTOR | PJS OBTAINMENT |
| IWB1 | DISPLAY ON IWB | IWB OBTAINMENT |
| MFP1 | PRINT | SCAN |
| PRT1 | PRINT | × |
| ⋮ | ⋮ | ⋮ |

INFORMATION PROCESSING SYSTEM, INFORMATION PROCESSING APPARATUS, DEVICE CONTROL METHOD, AND MEDIUM

BACKGROUND OF THE INVENTION

1. Field of the Invention

The disclosures herein generally relate to an information processing system, an information processing apparatus, a device control method, and a medium.

2. Description of the Related Art

Conventionally, a remote control system has been known that includes a household electrical appliance installed at home, and a communication controller that is attached to the household electrical appliance, and to be connected with a public communication channel, to control the household electrical appliance at home from an outdoor communication terminal via the public communication channel (see, for example, Patent Document 1).

An electronic device, for example, a printer, a multifunction peripheral, or a projector may be connected with a network such as a LAN, to be controlled by a user using various terminals such as a cellular phone, a smart phone, and a tablet terminal, via the network.

However, if the user uses his/her own terminal, the terminal may not be permitted to be connected with the network or a LAN having the printer, the multifunction peripheral, or the projector connected. As such, there is a problem that a terminal used by a user may not be connected with a network having an electronic device connected, and in this case, the electronic device cannot be controlled via the network.

SUMMARY OF THE INVENTION

It is a general object of at least one embodiment of the present invention to provide an information processing system, an information processing apparatus, a device control method, and a medium that substantially obviate one or more problems caused by the limitations and disadvantages of the related art. Specifically, it may be desirable to provide an information processing apparatus, a device control method, and a medium that can control an electronic device from a terminal that cannot be connected with a network having the electronic device connected.

According to at least one embodiment of the present invention, an information processing system includes a plurality of terminals configured to be connected with a first network; and an information processing apparatus configured to be connected with a second network different from the first network. A first terminal among the plurality of terminals includes a first device information obtainment unit configured to obtain device information of one or more electronic devices connected with the second network, from a device information storage device storing the device information of the one or more electronic devices; a first reception unit configured to receive from a user, a selection of one electronic device among the one or more electronic devices whose device information has been obtained; and an output request unit configured to transmit, by using the device information of the one electronic device having been selected by the user, a request for outputting electronic data on the one electronic device, to the information processing apparatus, via a relay device connected with the first terminal and the information processing apparatus. A second terminal among the plurality of terminals includes a second device information obtainment unit configured to obtain the device information of the one or more electronic devices, from the device information storage device; a second reception unit configured to receive from the user, a selection of the one electronic device outputting the electronic data based on the request for outputting, among the one or more electronic devices whose device information has been obtained; and an obtainment request unit configured to transmit, by using the device information of the one electronic device having been selected by the user, a request for obtaining electronic data on the one electronic device, to the information processing apparatus, via the relay device connected with the second terminal and the information processing apparatus, and to obtain the electronic data output by the one electronic device, via the relay device. The information processing apparatus includes a request obtainment unit configured to obtain from the relay device, the request for outputting the electronic data on the one electronic device, and the request for obtaining the electronic data on the one electronic device; an electronic device request unit configured to request the one electronic device to execute outputting the electronic data, based on the obtained request for outputting the electronic data on the one electronic device, to request the one electronic device to execute providing the electronic data output by the one electronic device, based on the obtained request for obtaining the electronic data on the one electronic device, and to receive the electronic data provided by the one electronic device; and an electronic data providing unit configured to provide the received electronic data provided by the one electronic device, to the second terminal.

According to at least one embodiment of the present invention, it is possible to control an electronic device from a terminal that cannot be connected with a network having the electronic device connected.

BRIEF DESCRIPTION OF THE DRAWINGS

Other objects and further features of embodiments will be apparent from the following detailed description when read in conjunction with the accompanying drawings, in which:

FIG. 8 is a configuration diagram of an example of device information stored in an NFC device;

FIG. 11 is a sequence chart of an example of a file output process in a cooperative processing system according to an embodiment of the present invention;

FIG. 12 is a configuration diagram of an example of a request for outputting a file;

FIG. 13 is a flowchart of an example of a device connection process;

FIG. 14 is an image view of an example of a file display screen in a state where a button can be selected to make a request for outputting a file on an electronic device;

FIG. 21 is a configuration diagram of an example of a table to associate a device type, an output type, and an obtainment type of an electronic device with each other;

DESCRIPTION OF THE PREFERRED EMBODIMENTS

Next, embodiments of the present invention will be described in detail. A cooperative processing system 1 in the embodiments is an example of an information processing system.

First Embodiment

System Configuration

Figure 1:
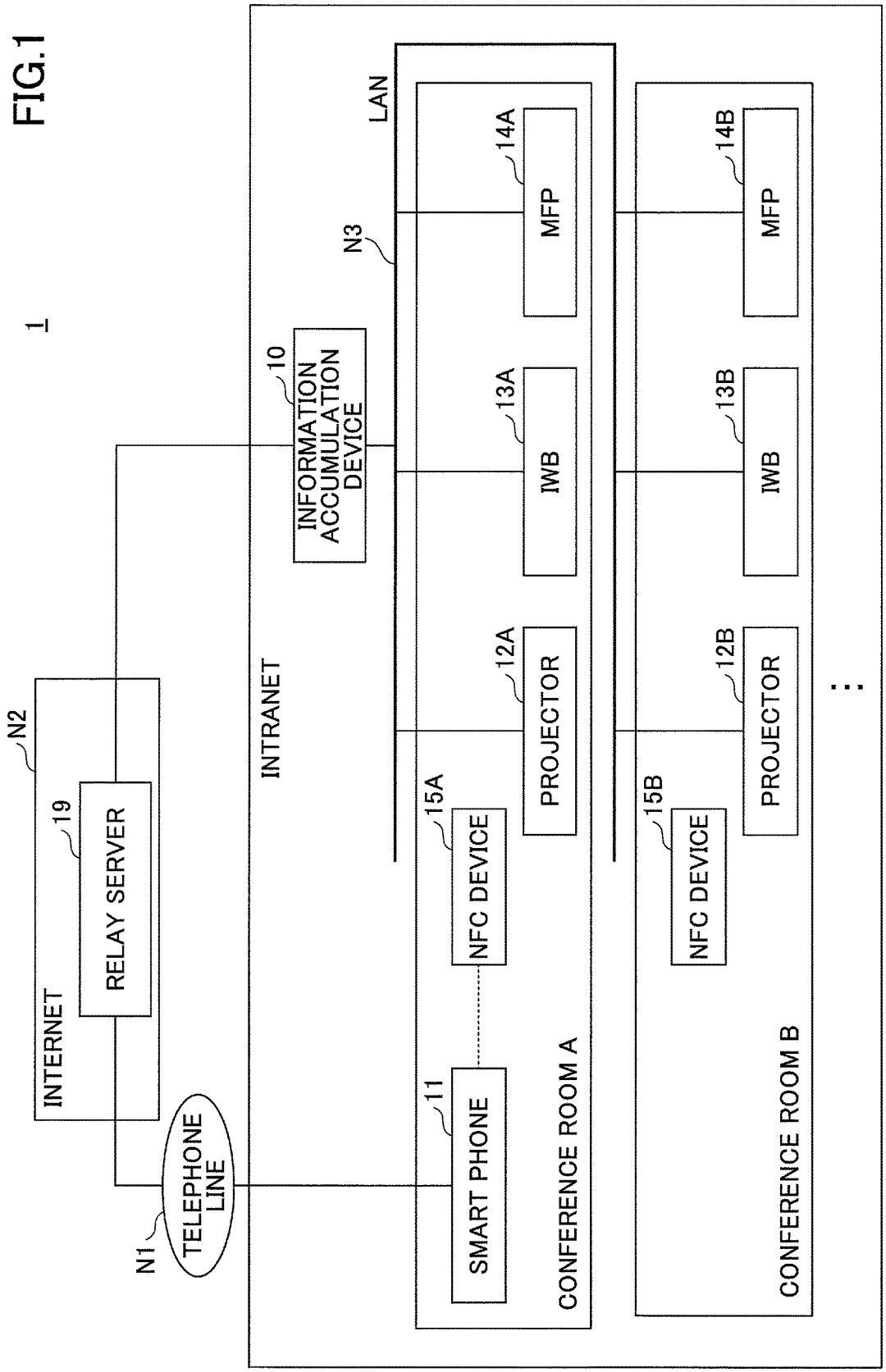
FIG. 1 is a configuration diagram of an example of a cooperative processing system according to an embodiment of the present invention.

FIG. 1 is a configuration diagram of an example of a cooperative processing system 1 according to the present embodiment. FIG. 1 illustrates, as an example, a configuration of the cooperative processing system 1 that includes an information accumulation device 10, a smart phone 11, projectors 12A and 12B, interactive white boards (referred to as "IWBs" below) 13A and 13B, MFPs (Multi-Function Peripherals) 14A and 14B, NFC (Near Field Communication) devices 15A and 15B, and a relay server 19.

The cooperative processing system 1 has the information accumulation device 10, the projectors 12A and 12B, the IWBs 13A and 13B, and the MFPs 14A and 14B connected with a network N3, which is a LAN or the like. Also, in the cooperative processing system 1, the information accumulation device 10 can be connected with a network N2, which is the Internet or the like.

Note that the example of the cooperative processing system 1 in FIG. 1 has the projector 12A, the IWB 13A, the MFP 14A, and the NFC device 15A installed in a conference room A, and has the projector 12B, the IWB 13B, the MFP 14B, the NFC device 15B installed in a conference room B.

Also, in the cooperative processing system 1, the relay server 19 exists in the network N2, which is the Internet or the like. Further, in the cooperative processing system 1, the smart phone 11 exists that can be connected with a network N1, which is a telephone communication channel or the like. By using the network N1, the smart phone 11 can establish a connection with the relay server 19 that exists in the network N2. Also, the information accumulation device 10 can establish a connection with the relay server 19 that exists in the network N2.

The network N1 can use a telephone communication channel, for example, a 3G communication channel. The network N3 can use a network for a private environment, for example, an in-house network. The relay server 19 existing in the network N2 may be omitted if the smart phone 11 can directly establish a connection with the information accumulation device 10 via the networks N1 and N2.

The information accumulation device 10 is an example of an information processing apparatus having an information sharing function. The information accumulation device 10 executes a sophisticated functional process, which may not be processed by the smart phone 11, a process as a file server, and a process to obtain a request from the smart phone 11 by establishing a connection with the relay server 19. Note that the information accumulation device 10 is set in advance to communicate with the smart phone 11 that is capable of using the information accumulation device 10. Also, the information accumulation device 10 may be configured to be distributed in multiple computers.

The smart phone 11 is an example of a terminal operated by a user. The terminal may be any apparatus other than the smart phone 11 such as a cellular phone, a note PC, or a tablet terminal, as long as it can be operated by a user.

The projectors 12A and 12B, the IWBs 13A and 13B, and the MFPs 14A and 14B are examples of an electronic device that can be controlled from the smart phone 11. The projectors 12A and 12B, the IWBs 13A and 13B, and the MFPs 14A and 14B provide respective interfaces (IFs) in the network N3.

The projectors 12A and 12B are examples of an image projection apparatus. Note that the projectors 12A and 12B may be simply referred to as the projector(s) 12 if distinction is not required. The projector 12 includes a projection function and a communication function.

The IWBs 13A and 13B are examples of an image display apparatus. Note that the IWBs 13A and 13B may be simply referred to as the IWBs) 13 if distinction is not required. The IWB 13 includes a display function and a communication function. The MFPs 14A and 14B are examples of an image forming apparatus. Note that the MFPs 14A and 14B may be simply referred to as the MFP(s) 14 if distinction is not required. The MFP 14 has an imaging function, an image forming function, and a communication function, and can be used as a printer, a facsimile, a scanner, a copier, and the like.

The NFC devices 15A and 15B use a short-distance wireless communication technology such as Bluetooth (trademark), NFC (Near Field Communication), or the like, to provide device information to the smart phone 11 as will be described later. Note that the NFC devices 15A and 15B may be simply referred to as the NFC device(s) 15 if distinction is not required.

Figure 2:
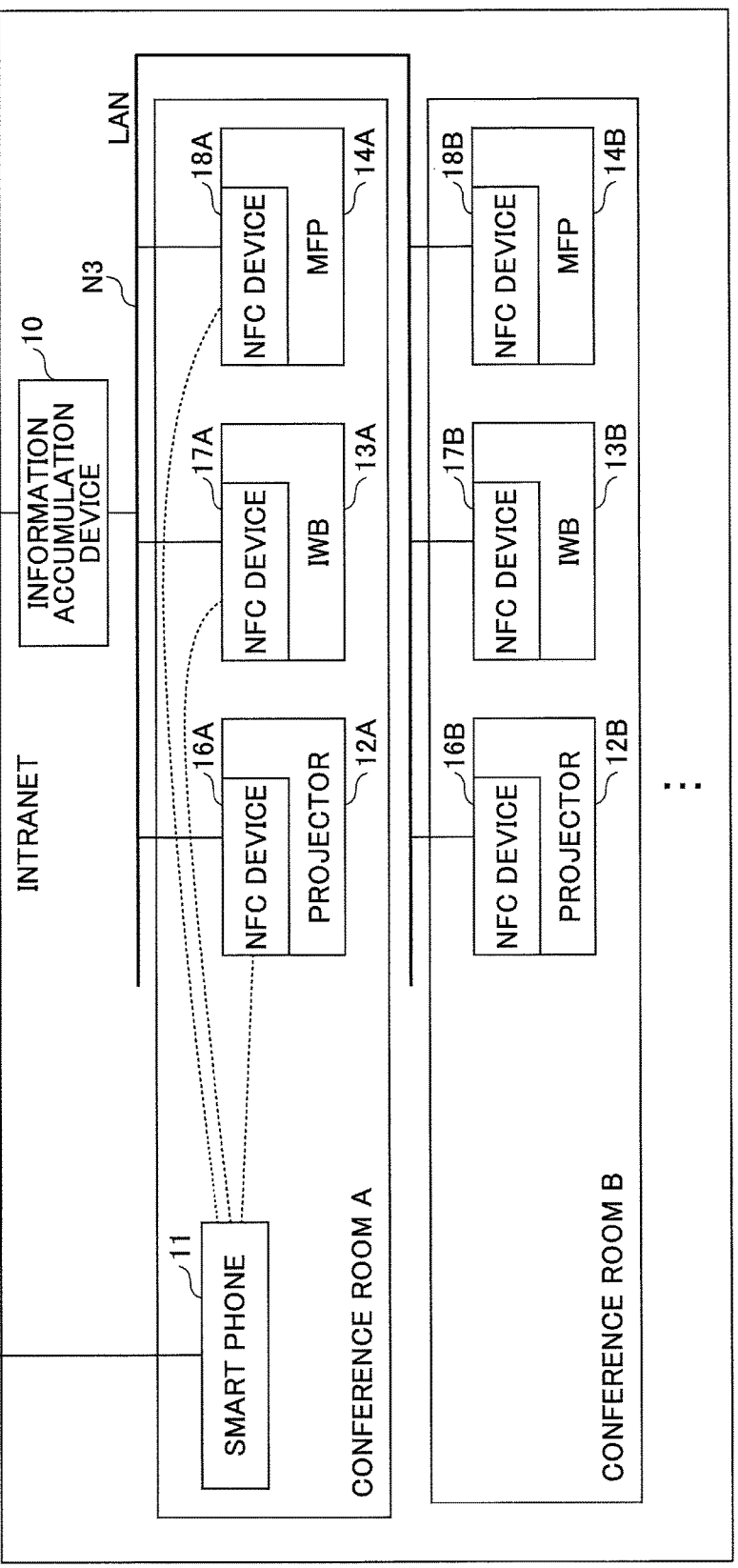
FIG. 2 is a configuration diagram of another example of a cooperative processing system according to an embodiment of the present invention.

The NFC devices 15 in FIG. 1 are disposed in the conference rooms, respectively. Alternatively, as illustrated in FIG. 2, the NFC devices 15 may be provided for the projector 12, the IWB 13, and the MFP 14, respectively, that are installed in each of the conference rooms. FIG. 2 is a configuration diagram of another example of the cooperative processing system 1a according to the present embodiment.

In the cooperative processing system 1a in FIG. 2, the projector 12A, the IWB 13A, and the MFP 14A have the NFC devices 16A, 17A, and 18A attached, respectively, and the projector 12B, the IWB 13B, the MFP 14B have the NFC devices 16B, 17B, and 18B attached, respectively.

The examples of the cooperative processing system 1 in FIG. 1 and the cooperative processing system 1a in FIG. 2 illustrate the smart phone 11 exists in the conference room A. For example, the smart phone 11 existing in the cooperative processing system 1 in FIG. 1 obtains device information from the NFC device 15A as will be described later. Also, the smart phone 11 existing in the cooperative processing system 1a in FIG. 2 obtains device information from the NFC devices 16A, 17A and 18A as will be described later.

<Hardware Configuration>
<<Computer>>

Figure 3:
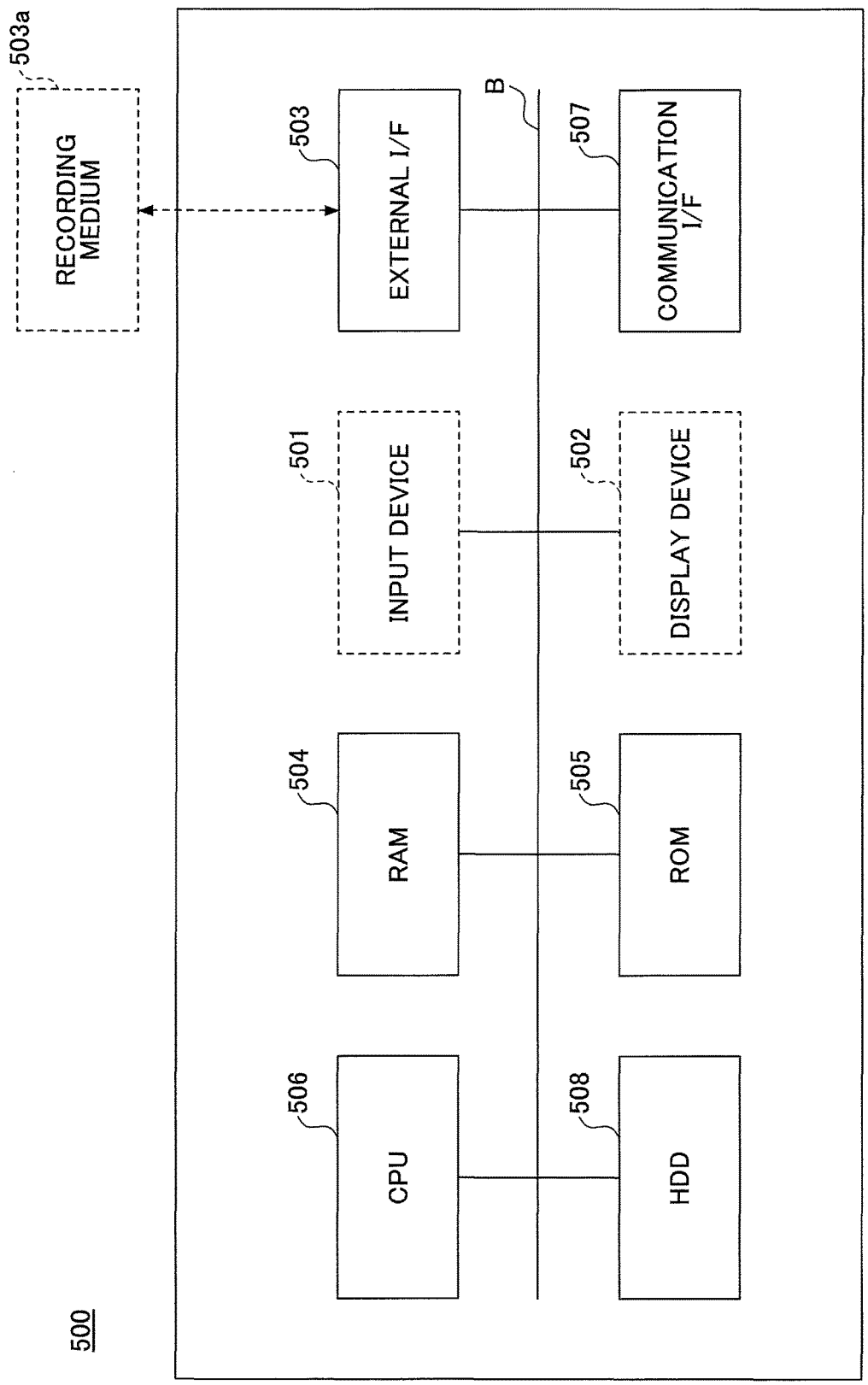
FIG. 3 is a hardware configuration diagram of an example of a computer according to an embodiment of the present invention.

The information accumulation device 10 and the relay server 19 are implemented by computers having a hardware configuration, for example, as illustrated in FIG. 3. FIG. 3 is a hardware configuration diagram of an example of a computer 500 according to the present embodiment.

The computer 500 in FIG. 3 includes an input device 501, a display device 502, an external I/F 503, a RAM 504, a ROM 505, a CPU 506, a communication I/F 507, and an HDD 508, which are mutually connected by a bus B. Note that the input device 501 and the display device 502 may be configured to be connected when necessary to be used.

The input device 501 includes a keyboard, a mouse, and a touch panel that are used by a user to input operational signals. The display device 502 includes a display to show a processed result by the computer 500.

The communication I/F 507 is an interface to have the computer 500 connected with various networks. Thus, the computer 500 can execute data communication via the communication I/F 507.

Also, the HDD 508 is an example of a non-volatile storage device to store programs and data. The stored programs and data include an OS that is basic software to control the computer 500 as a whole, and application software (simply referred to as the "application(s)", below) that provides various functions on the OS. Note that the computer 500 may use a drive unit that uses a flash memory as a recording medium (for example, an SSD (Solid State Drive)), instead of the HDD 508.

The external I/F 503 is an interface with an external device. The external device may be a recording medium 503a. Thus, the computer 500 can execute reads and/or writes on the recording medium 503a via the external I/F 503. The recording medium 503a may be a flexible disk, a CD, a DVD, an SD memory card, or a USB memory.

The ROM 505 is an example of a non-volatile semiconductor memory (a storage device) that can hold programs and data even when the power is turned off. The ROM 505 stores a BIOS (Basic Input/Output System) that is executed when activating the computer 500, and programs and data for OS (Operation System) setting and network setting. The RAM 504 is an example of a volatile semiconductor memory (a storage device) to store programs and data temporarily.

The CPU 506 is a processor that implements control and functions of the computer 500 as a whole, by reading the programs and data into the RAM 504 from the storage device such as the ROM 505 and the HDD 508, and executing processes.

By the hardware configuration of the computer 500, for example, as illustrated in FIG. 3, the information accumulation device 10 and the relay server 19 can implement various processes as will be described later.

<<Terminal>>

Figure 4:
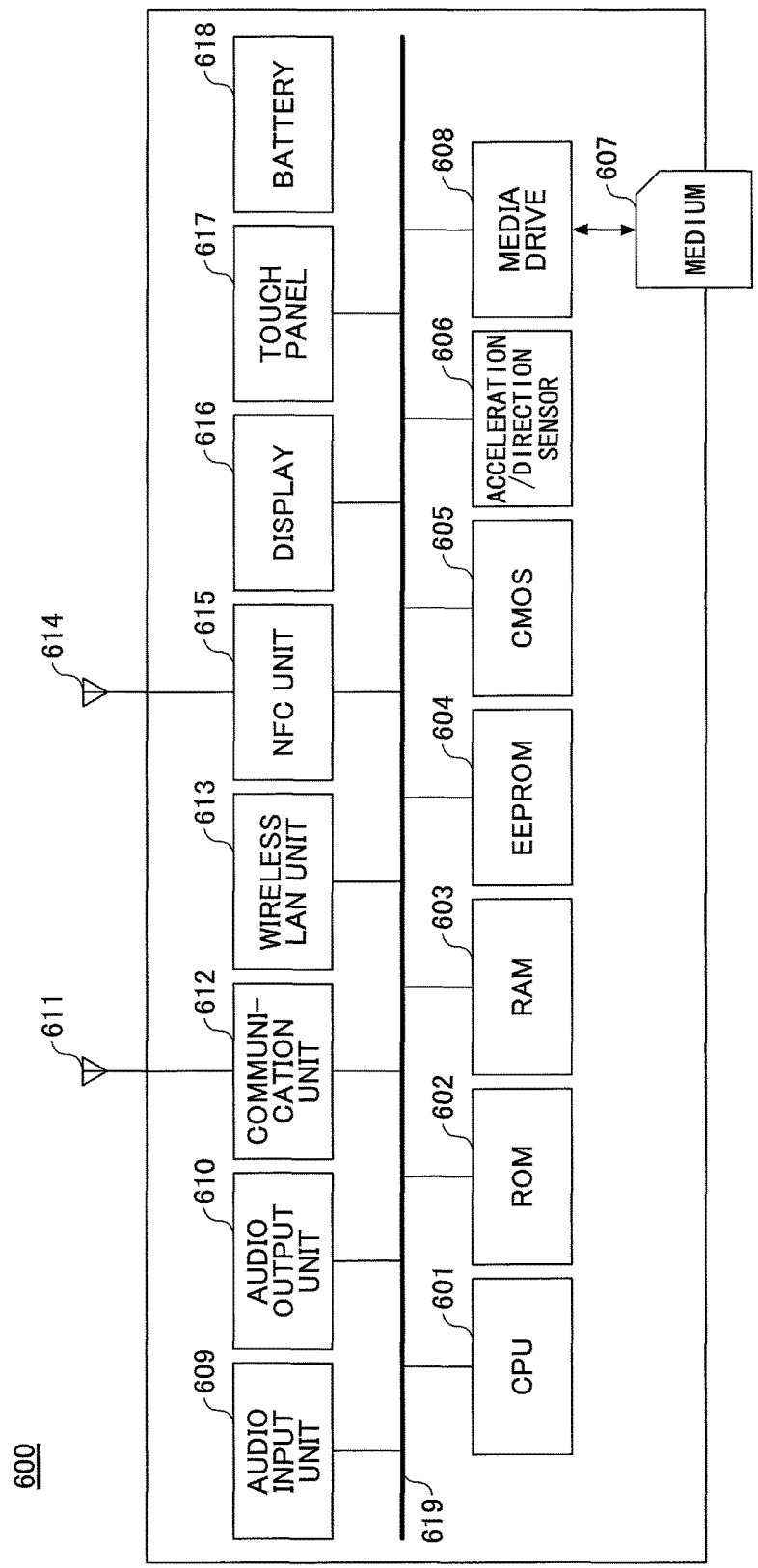
FIG. 4 is a hardware configuration diagram of an example of a terminal according to an embodiment of the present invention.

The smart phone 11 is implemented by a hardware configuration, for example, as illustrated in FIG. 4. FIG. 4 is a hardware configuration diagram of an example of a terminal 600 according to the present embodiment. The terminal 600 in FIG. 4 includes, for example, a CPU 601, a ROM 602, a RAM 603, an EEPROM 604, a CMOS sensor 605, an acceleration/direction sensor 606, and a media drive 608.

The CPU 601 controls operations of the terminal 600 as a whole. The ROM 602 stores a basic input/output program. The RAM 603 is used as a work area of the CPU 601. The EEPROM 604 executes reads and writes of data under the control of the CPU 601. The CMOS sensor 605 captures an image of an object under the control of the CPU 601, to obtain image data. The acceleration/direction sensor 606 is an electromagnetic compass to detect the terrestrial magnetism, a gyro compass, an acceleration sensor, and the like.

The media drive 608 controls reads and writes (storage) of data on a recording medium 607 such as a flash memory. The media drive 608 is configured to have a recording medium 607 easily attached or detached, on which already recorded data is read out and new data is written to be stored.

Note that the EEPROM 604 stores association information that is required for the OS and network settings executed by the CPU 601. Applications to execute various processes in the embodiments of the present invention are stored in the EEPROM 604 or the recording medium 607.

Also, the CMOS sensor 605 is a charge coupled device that electronizes an image of an object by converting light into electric charge. The CMOS sensor 605 may be, for example, a CCD (Charge Coupled Device) sensor as long as an image of an object can be captured.

Further, the terminal 600 includes an audio input unit 609, an audio output unit 610, an antenna 611, a communication unit 612, a wireless LAN unit 613, an NFC antenna 614, an NFC unit 615, a display 616, a touch panel 617, and a bus line 619.

The audio input unit 609 converts sound into an audio signal. The audio output unit 610 converts an audio signal into sound. The communication unit 612 executes a communication with a nearby base station apparatus by a wireless communication signal, and by using the antenna 611. The wireless LAN unit 613 executes a wireless LAN communication with an access point, which is compliant with IEEE80411 standards. The NFC unit 615 executes a near field communication by using the NFC antenna 614.

The display 616 is an LCD, an organic EL display, or the like to display an image of an object, various icons, and the like. The touch panel 617 is disposed on the display 616, and is configured to include a pressure-sensitive or electrostatic panel, to detect a contact position on the display 616 when touched by a finger, a touch pen, or the like. The bus line 619 is an address bus, a data bus, and the like to have the above units electrically connected with each other.

Also, the terminal 600 includes a custom battery 618. The terminal 600 is driven by the battery 618. Note that the audio input unit 609 includes a microphone to input sound. The audio output unit 610 includes a loudspeaker to output sound.

By the hardware configuration of the terminal 600, for example, as illustrated in FIG. 4, the smart phone 11 can implement various processes as will be described later.

<Software Configuration>
<<Information Accumulation Device>>

Figure 5:
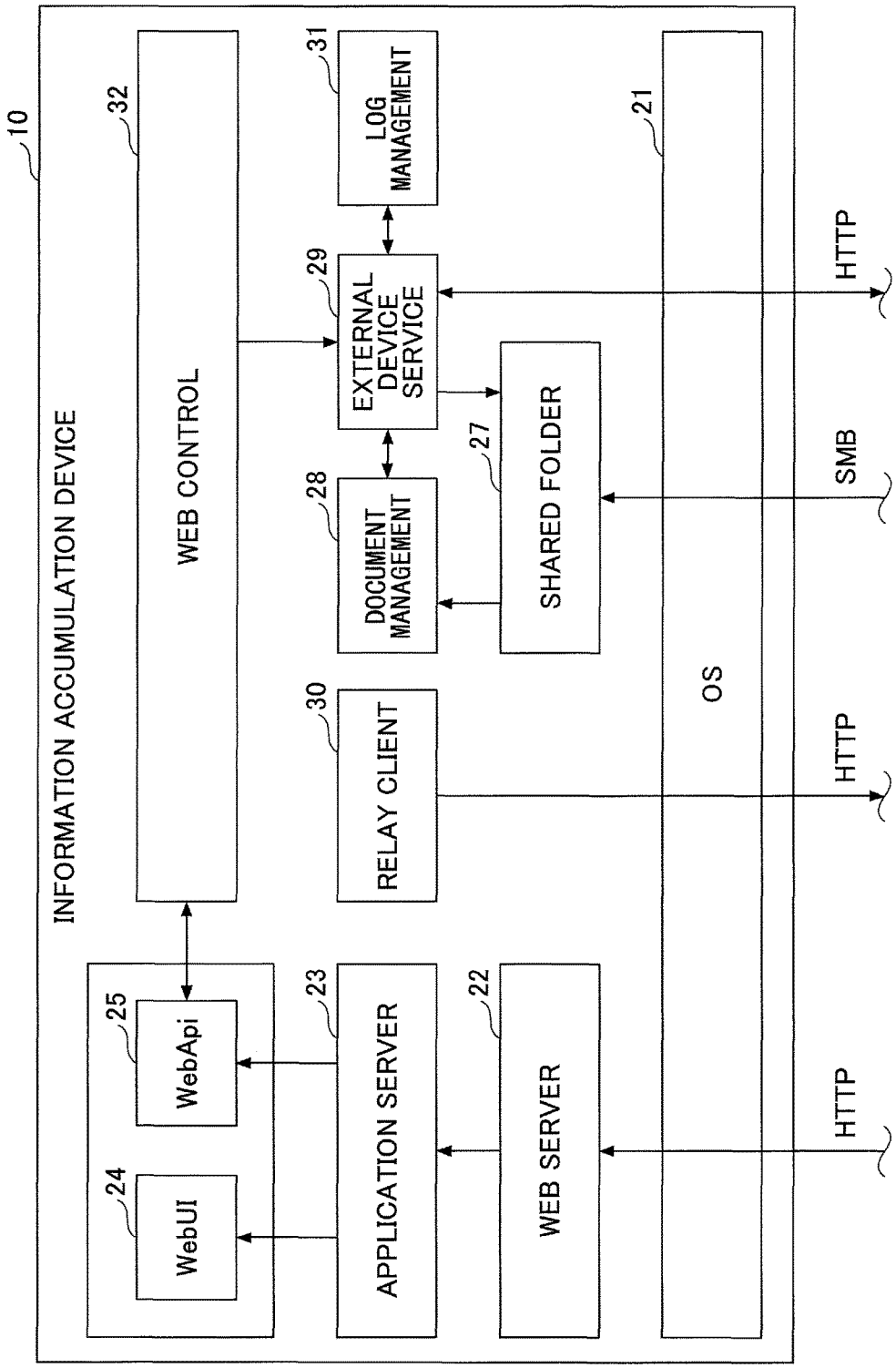
FIG. 5 is a process block diagram of an example of an information accumulation device according to an embodiment of the present invention.

The information accumulation device 10 according to the present embodiment is implemented by, for example, process blocks illustrated in FIG. 5. FIG. 5 is a process block diagram of an example of the information accumulation device 10 according to the present embodiment. By executing a program, the information accumulation device 10 implements an OS 21, a Web server 22, an application server 23, a Web UI 24, a Web API 25, a shared folder 27, document management 28, an external device service 29, a relay client 30, log management 31, and Web control 32.

The OS 21 is an operating system of the information accumulation device 10, to control the entire system. The OS 21 is, for example, Windows (trademark) or Linux (trademark).

The Web server 22 is software to receive and transmit information by HTTP (Hyper Text Transfer Protocol). The Web server 22 is, for example, Apache (trademark) or IIS (trademark).

The application server 23 is software that operates, for example, as a plug-in of the Web server 22. The application server 23 is, for example, Tomcat (trademark).

The Web UI 24 displays a system setting screen upon a HTTP request. A user may use a Web browser (not shown) to change the setting on the system setting screen.

The Web API (Application Programming Interface) 25 can be used via the networks N2 and N3. The Web API 25 receives an HTTP request, executes a process depending on the HTTP request, and returns an HTTP response.

The Web API 25 is a predefined interface that is provided to receive a request from a terminal such as the smart phone 11, and is constituted with, for example, functions and classes, and the like.

The Web control 32 executes a process to control the external device service 29 in response to a request from the Web API. The shared folder 27 is a folder that is public on the networks N2 and N3 by the SMB (Server Message Block) protocol. A user can access the shared folder 27 by using the terminal 600 such as the smart phone 11.

Also, the document management 28 manages a file placed in the shared folder 27, and executes a file conversion process in response to a request from the external device service 29. Note that a file in the present embodiment is a form of data.

The external device service 29 executes a process to send a request for a Web service of an electronic device such as the projector 12, the IWB 13, or the MFP 14. The relay client 30 accesses the relay server 19, and executes a process to obtain a request from the smart phone 11. The log management 31 executes a process to manage log data (log information).

<<Smart Phone>>

Figure 6:
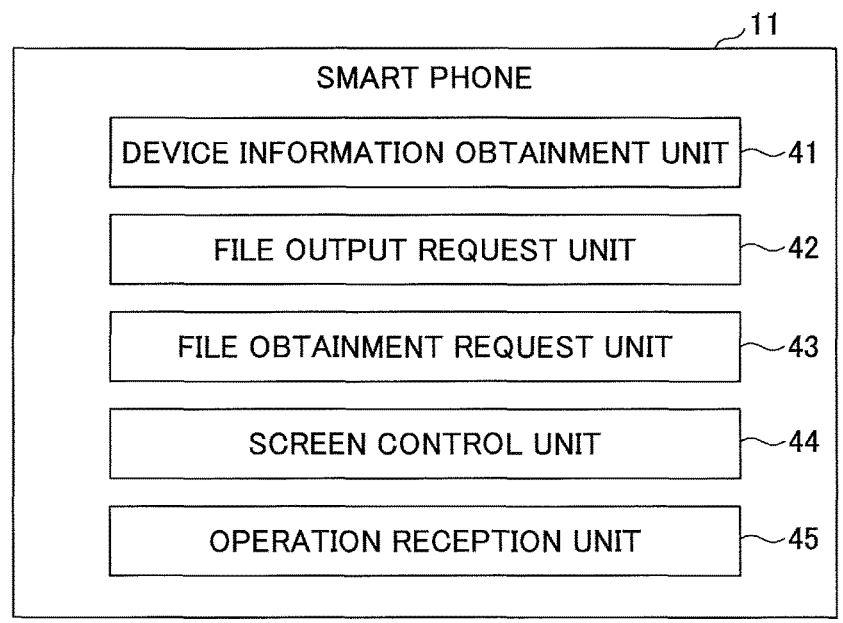
FIG. 6 is a process block diagram of an example of a smart phone according to an embodiment of the present invention.

The smart phone 11 according to the present embodiment is implemented by process blocks, for example, as illustrated in FIG. 6. FIG. 6 is a process block diagram of an example of the smart phone 11 according to the present embodiment. By executing a program, the smart phone 11 implements a device information obtainment unit 41, a file output request unit 42, a file obtainment request unit 43, a screen control unit 44, and an operation reception unit 45.

The device information obtainment unit 41 obtains device information from the NFC devices 15 to 18. The file output request unit 42 transmits a request for outputting a file on an electronic device, for example, the projector 12, the IWB 13, or the MFP 14, to the information accumulation device 10 via the relay server 19. The file obtainment request unit 43 transmits a request for obtaining a file on an electronic device, for example, the projector 12, the IWB 13, or the MFP 14, to the information accumulation device 10 via the relay server 19. The screen control unit 44 executes controlling a screen shown on the display 616. The operation reception unit 45 receives an operation from a user.

<Details of Processes>

In the following, details of processes in the cooperative processing system 1 will be described according to the present embodiment.

<<Device Information Obtainment>>

Figure 7:
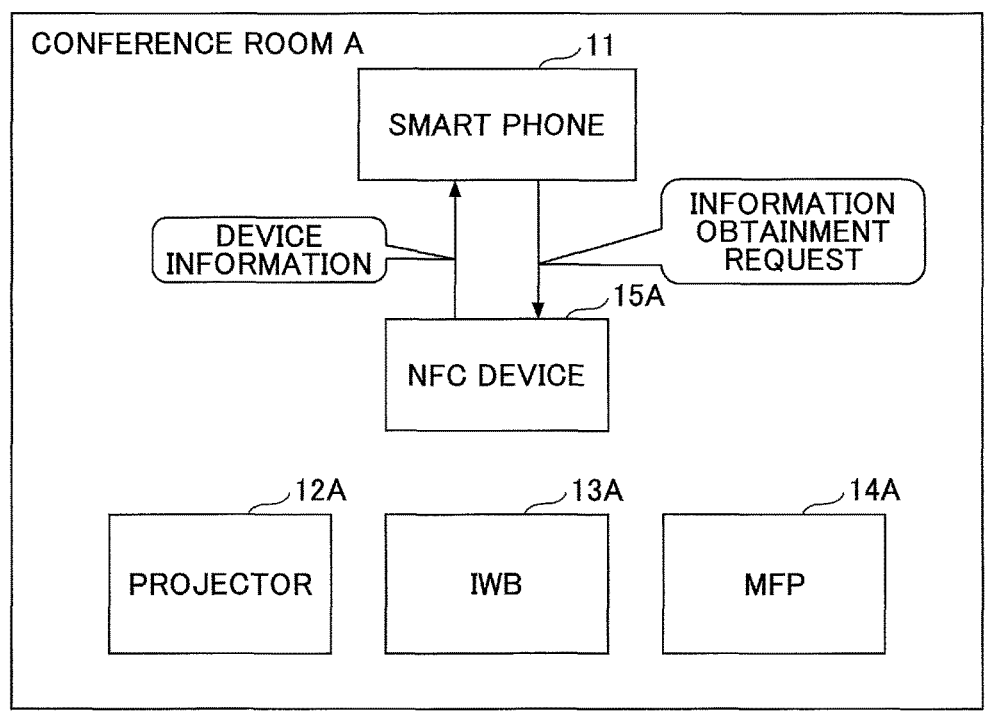
FIG. 7 is an explanatory diagram of an example of steps to obtain device information.

In the cooperative processing system 1 in FIG. 1, the smart phone 11 obtains device information, for example, as illustrated in FIG. 7. FIG. 7 is an explanatory diagram of an example of steps to obtain the device information. The cooperative processing system 1 in FIG. 1 has one NFC device 15A installed in the conference room A. The NFC device 15A stores device information, for example, as illustrated in FIG. 8.

FIG. 8 is a configuration diagram of an example of device information stored in the NFC device 15A. The device information in FIG. 8 includes information to identify the projector 12A, the IWB 13A, and the MFP 14A installed in the conference room A, information to connect with the projector 12A, the IWB 13A, and the MFP 14A, and information to identify the conference room. FIG. 8 illustrates an IP address, a host name, and a MAC address as an example of the information to connect with the projector 12A, the IWB 13A, or the MFP 14A. By requesting the device information to the NFC device 15A, the smart phone 11 can obtain the device information of all electronic devices installed in the conference room A as illustrated in FIG. 8.

Figures 9, 10:
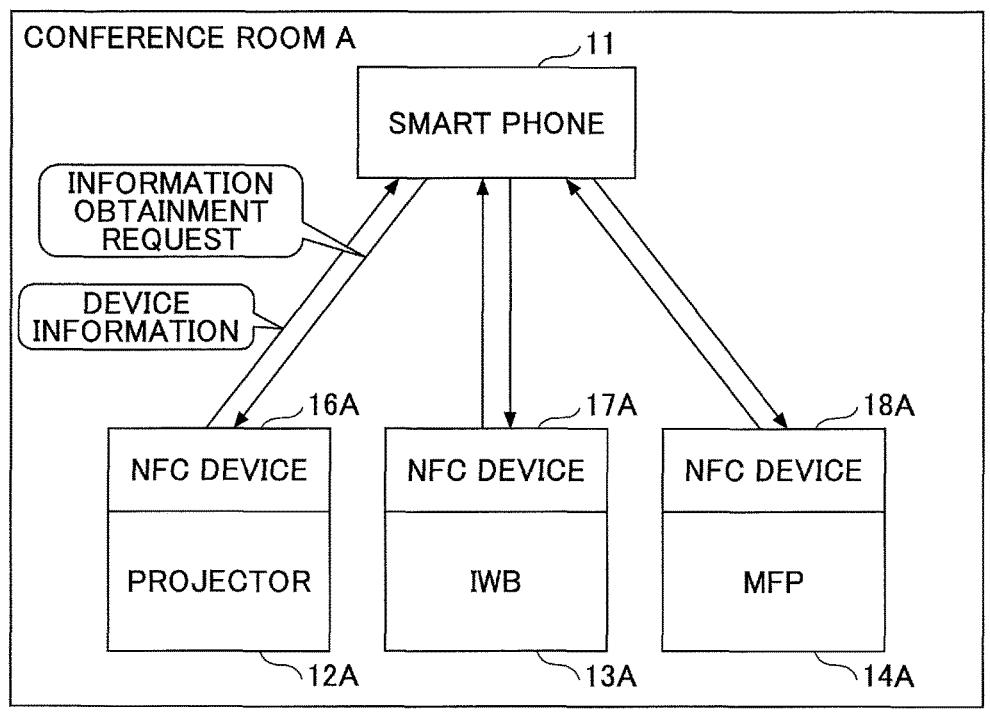
FIG. 9 is an explanatory diagram of another example of steps to obtain device information.
FIG. 10 is a configuration diagram of an example of device information stored in an NFC device.

In the cooperative processing system 1a in FIG. 2, the smart phone 11 obtains device information, for example, as illustrated in FIG. 9. FIG. 9 is an explanatory diagram of an example of steps to obtain the device information. The cooperative processing system 1a in FIG. 2 has the NFC devices 16A to 18A attached to the projector 12A, the IWB 13A, and the MFP 14A, respectively, that are installed in the conference room A. For example, the NFC device 16A stores the device information as illustrated in FIG. 10.

FIG. 10 is a configuration diagram of an example of the device information stored in the NFC device 16A. The device information in FIG. 10 illustrates an example of the device information of the projector 12A installed in the conference room A. The device information of the projector 12A in FIG. 10 includes information to identify the projector 12A, information to connect with the projector 12A, and information to identify the conference room. FIG. 10 illustrates an IP address, a host name, and a MAC address as an example of the information to connect with the projector 12A. By requesting the device information to the NFC device 16A, the smart phone 11 can obtain the device information of the projector 12A having the NFC device 16A attached, as illustrated in FIG. 10.

Similarly, by requesting the device information to the NFC devices 17A and 18A, the smart phone 11 can obtain the device information of the IWB 13A and the MFP 14A, respectively. The device information of the IWB 13A and the MFP 14A is omitted in the figure.

In this way, in the cooperative processing systems 1 and 1a in the present embodiment, by having the NFC devices 15 to 18 obtain the device information, it is possible to permit the smart phone 11 to control an electronic device in a limited space such as the conference room.

Also, in the cooperative processing systems 1 and 1a in the present embodiment, by having the NFC devices 15 to 18 obtain the device information, a user can save the trouble of inputting the device information into the smart phone 11.

<<File Output Process>>

In the following, a file output process in the cooperative processing system 1 will be described as an example. A file output process in the cooperative processing system 1a is the same except for a step to obtain the device information.

FIG. 11 is a sequence chart of an example of a file output process in the cooperative processing system 1 according to the present embodiment. The sequence chart in FIG. 11 illustrates a process to have a file output on the projector 12A, upon a request from the smart phone 11 connected with the network N1 such as a telephone communication channel.

At Step S1, the device information obtainment unit 41 of the smart phone 11 obtains the device information illustrated in FIG. 8 from the NFC device 15A. Then, the smart phone 11 executes a device connection process as will be described later.

At Step S2, the file output request unit 42 of the smart phone 11 transmits a request for outputting a file on the projector 12A to the relay server 19. The request for outputting the file transmitted at Step S2 is configured, for example, as illustrated in FIG. 12.

FIG. 12 is a configuration diagram of an example of a request for outputting a file. The request for outputting the file in FIG. 12 includes an information accumulation device ID, authentication information of the information accumulation device, device connection information, and a request command. The information accumulation device ID is an ID to identify the information accumulation device 10, and is used by the relay server 19 to manage the request. The authentication information of an information accumulation device is authentication information of the smart phone 11 to access the information accumulation device 10, and is used by the information accumulation device 10 to inhibit an invalid access.

The device connection information includes an IP address and a host name to establish a network connection with an electronic device such as the projector 12A, which is obtained from the NFC device 15A. The request command is a command to execute the IF provided by an electronic device such as the projector 12A. For example, the request command may be an HTTP request to execute the IF of the Web API.

At Step S3, the information accumulation device 10 transmits a request for obtaining a request to the relay server 19. At Step S4, the information accumulation device 10 obtains the request for outputting the file in FIG. 12 from the relay server 19. At Step S5, based on the obtained request for outputting the file in FIG. 12, the information accumulation device 10 has the projector 12A, specified by the device connection information, execute outputting the file depending on the request command. Note that the file output process executed by the information accumulation device 10 and the projector 12A at Step S5 will be described in detail later.

At Step S6, the information accumulation device 10 returns an output result obtained from the projector 12A to the relay server 19 as a response to the request at Step S4. At Step S7, the relay server 19 returns the output result obtained from the information accumulation device 10 to the smart phone 11 as a response to the request at Step S2.

The device connection process at Step S1 is executed, for example, as follows. For example, a user holding the smart phone 11 enters the conference room A, and activates an application to execute a file output process. The application to execute the file output process activated on the smart phone 11 executes a device connection process, for example, as illustrated in FIG. 13.

FIG. 13 is a flowchart of an example of the device connection process. The device information obtainment unit 41 of the smart phone 11 obtains at Step S11 the device information of all electronic devices installed in the conference room A by requesting the device information to the NFC device 15A.

At Step S12, by using the obtained device information of the electronic devices, the screen control unit 44 of the smart phone 11 transmits a connection confirmation request to the relay server 19. If the connection is confirmed with the electronic device, at Step S14, the screen control unit 44 displays buttons 1001 on a file display screen as in FIG. 14 in a state where a button can be selected to make a request for outputting a file on the electronic device.

Figure 15:
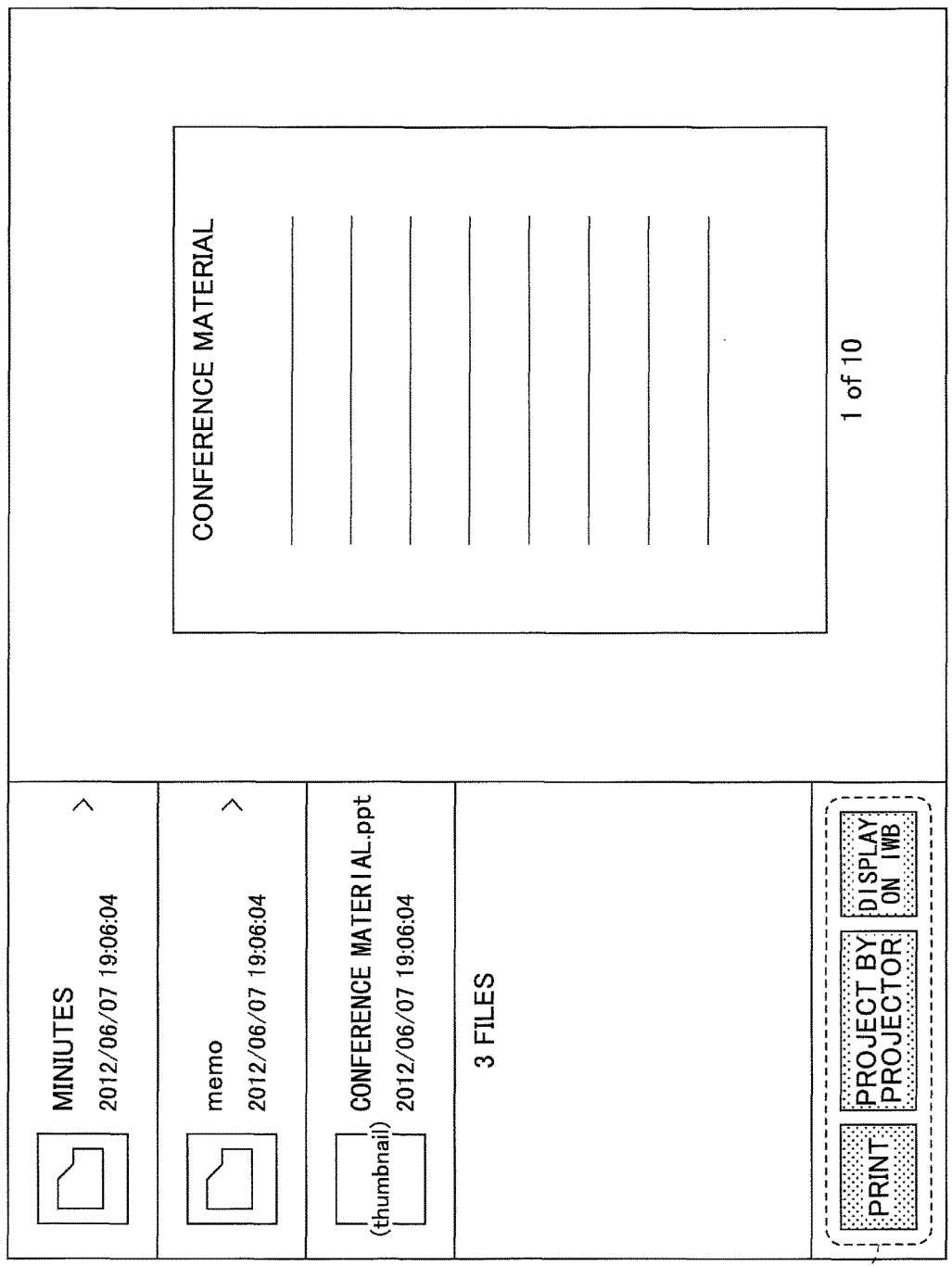
FIG. 15 is an image view of an example of a file display screen in a state where a button cannot be selected to make a request for outputting a file on an electronic device.

If the connection is not confirmed with the electronic device, the screen control unit 44 displays the buttons 1001 on the file display screen as in FIG. 15 in a state where a button cannot be selected to make a request for outputting a file on the electronic device.

FIG. 14 is an image view of an example of the file display screen in a state where a button can be selected to make a request for outputting a file on the electronic device. FIG. 15 is an image view of an example of the file display screen in a state where a button cannot be selected to make a request for outputting a file on an electronic device.

For example, the screen control unit 44 of the smart phone 11 displays the file display screen as in FIG. 15 until the connection is confirmed with the electronic device by the connection confirmation request at Step S12. Having confirmed the connection with the electronic device, the screen control unit 44 displays the file display screen in FIG. 14 in which the buttons 1001 to make a request for outputting a file on the electronic device are updated from the non-selectable state to the selectable state.

A user can make a request for outputting a file on the file display screen in FIG. 14, by pressing a "project by projection" button included in the buttons 1001 to make a request for outputting a file on the electronic device. If the "project by projection" button is pressed, the file output request unit 42 of the smart phone 11 has the projector 12A output, for example, a file displayed on the right side of the file display screen in FIG. 14.

Figure 16:
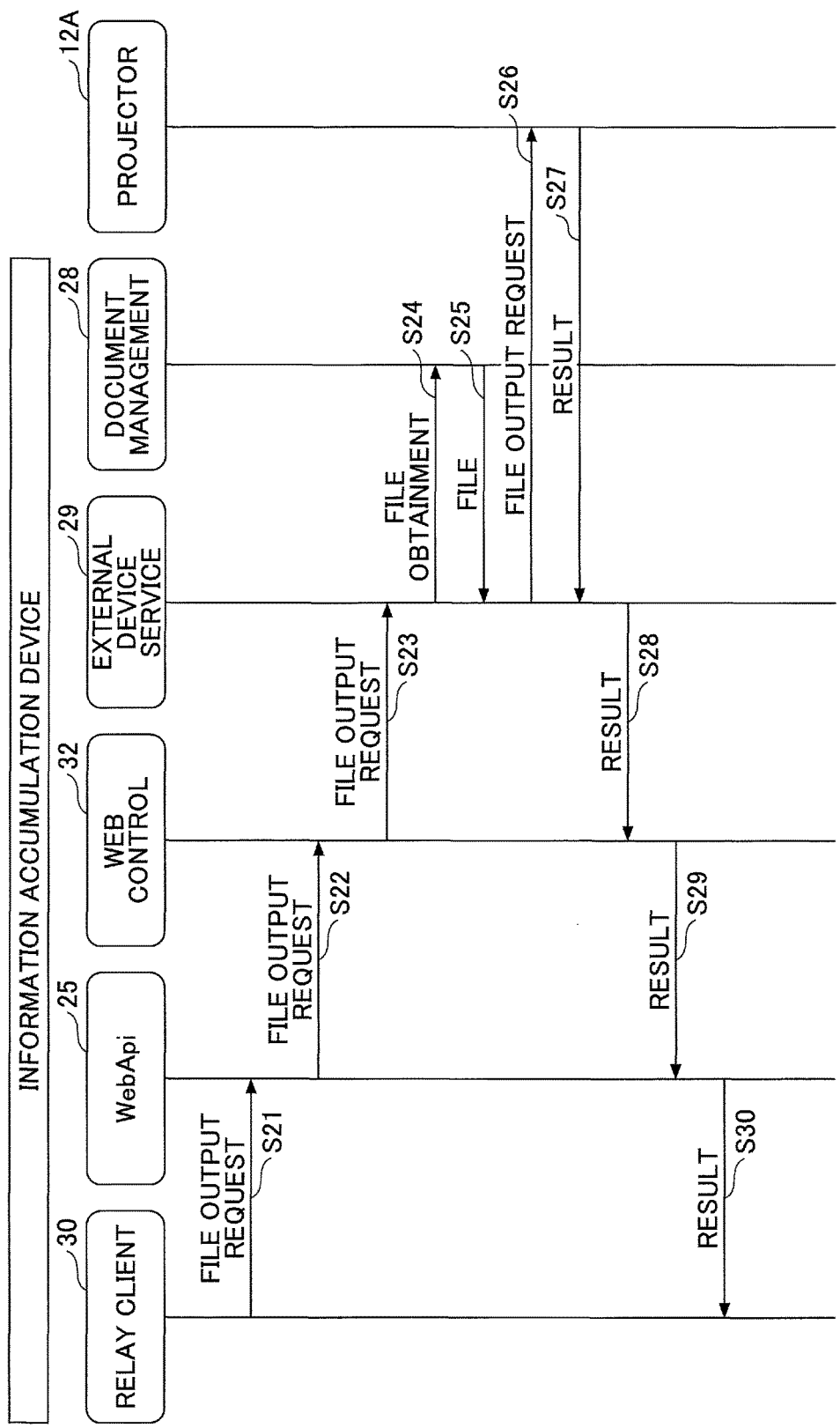
FIG. 16 is a sequence chart of an example of a file output process executed by an information accumulation device and a projector.

The file output process executed by the information accumulation device 10 and the projector 12A at Step S5 is executed, for example, as illustrated in FIG. 16. FIG. 16 is a sequence chart of an example of a file output process executed by the information accumulation device 10 and the projector 12A.

The relay client 30 of the information accumulation device 10 obtains a request for outputting a file from the relay server 19. At Step S21, the relay client 30 transfers the obtained request for outputting the file to the Web API 25. At Step S22, the Web API 25 transfers the request for outputting the file to the Web control 32. At Step S23, the Web control 32 transfers the request for outputting the file to the external device service 29.

At Step S24, based on the transferred request for outputting the file, the external device service 29 makes a request for obtaining the file to the document management 28. Here, the file is assumed to be stored in the shared folder 27 in the information accumulation device 10. The document management 28 converts the file requested for obtaining the file from the external device service 29 into a format that can be output by the projector 12A, and returns the converted file to the external device service 29.

Note that the format conversion process may be executed after the request has been made for obtaining the file, or at a timing when a user saves the file in the shared folder 27. At Step S26, based on the request for outputting the file transferred at Step S23, the external device service 29 has the projector 12A output the file in response to the request command.

At Step S27, the external device service 29 receives an output result from the projector 12A. At Step S28, the external device service 29 returns the output result obtained from the projector 12A to the Web control 32 as a response to the request at Step S23. At Step S29, the Web control 32 returns the output result obtained from the external device service 29 to the Web API 25 as a response to the request at Step S22. At Step S30, the Web API 25 returns the output result obtained from the Web control 32 to the relay client 30 as a response to the request at Step S21.

In this way, in the cooperative processing system 1 in the present embodiment, if a user enters the conference room A while holding the smart phone 11 that cannot be connected with the network N3 having an electronic device such as the projector 12A connected, the user can control the electronic device from the smart phone 11.

<<File Obtainment Process>>

In the following, a file obtainment process in the cooperative processing system 1 will be described as an example. A file obtainment process in the cooperative processing system 1a is the same except for a step to obtain the device information.

Figure 17:
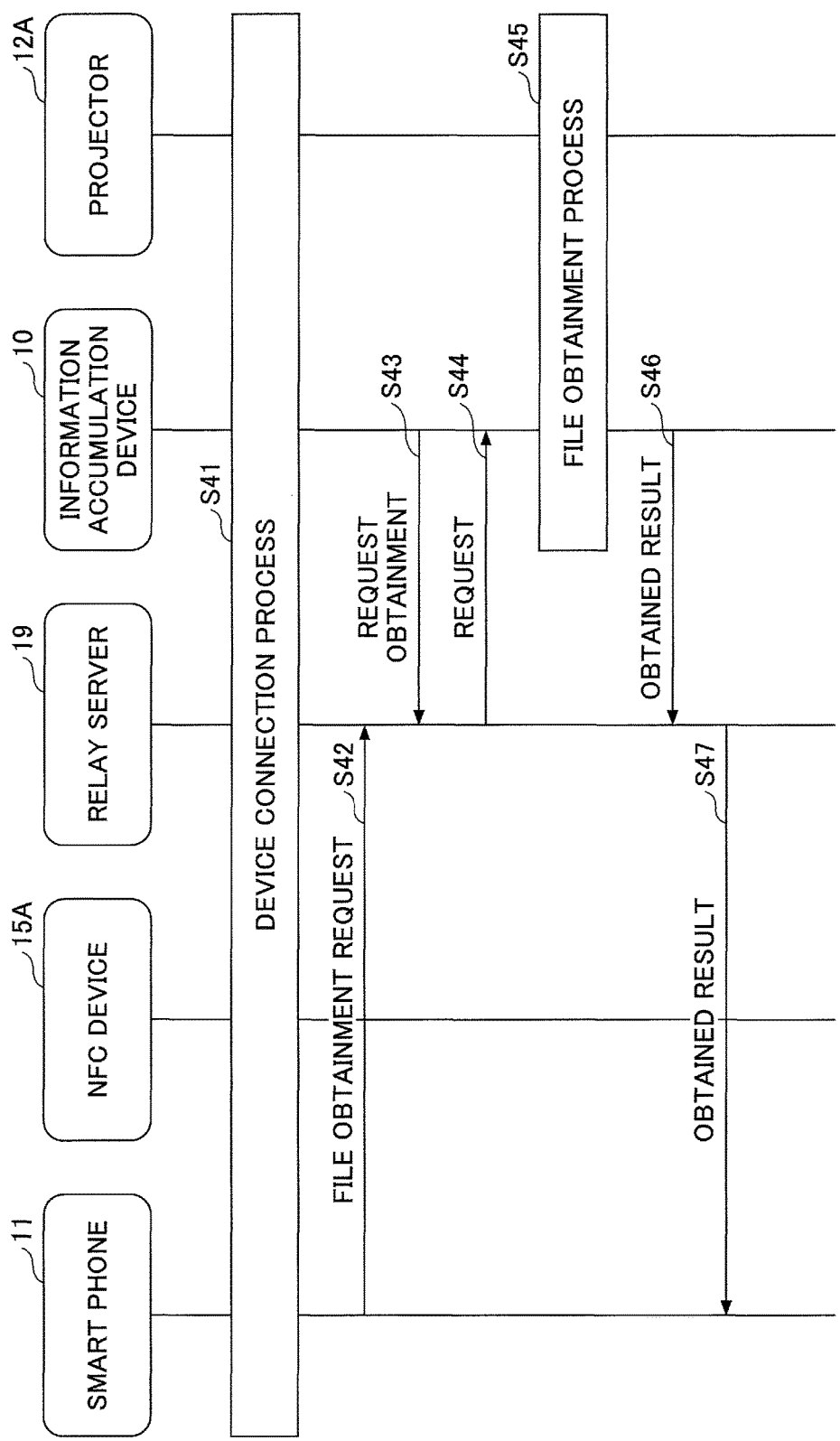
FIG. 17 is a sequence chart of an example of a file obtainment process in a cooperative processing system according to an embodiment of the present invention.

FIG. 17 is a sequence chart of an example of a file obtainment process in the cooperative processing system 1 according to the present embodiment. The sequence chart in FIG. 17 illustrates a process to obtain a file from the projector 12A, upon a request from the smart phone 11 connected with the network N1 such as a telephone communication channel.

At Step S41, the device information obtainment unit 41 of the smart phone 11 obtains the device information illustrated in FIG. 8 from the NFC device 15A. Then, the smart phone 11 executes a device connection process as illustrated in FIG. 13.

In the device connection process at Step S41, for example, a user holding the smart phone 11 enters the conference room A, and activates an application to execute a file obtainment process. The device information obtainment unit 41 of the smart phone 11 obtains the device information of all electronic devices installed in the conference room A by requesting the device information to the NFC device 15A. By using the obtained device information of the electronic devices, the screen control unit 44 of the smart phone 11 transmits a connection confirmation request to the relay server 19, to confirm the connection with the electronic device.

Figure 18:
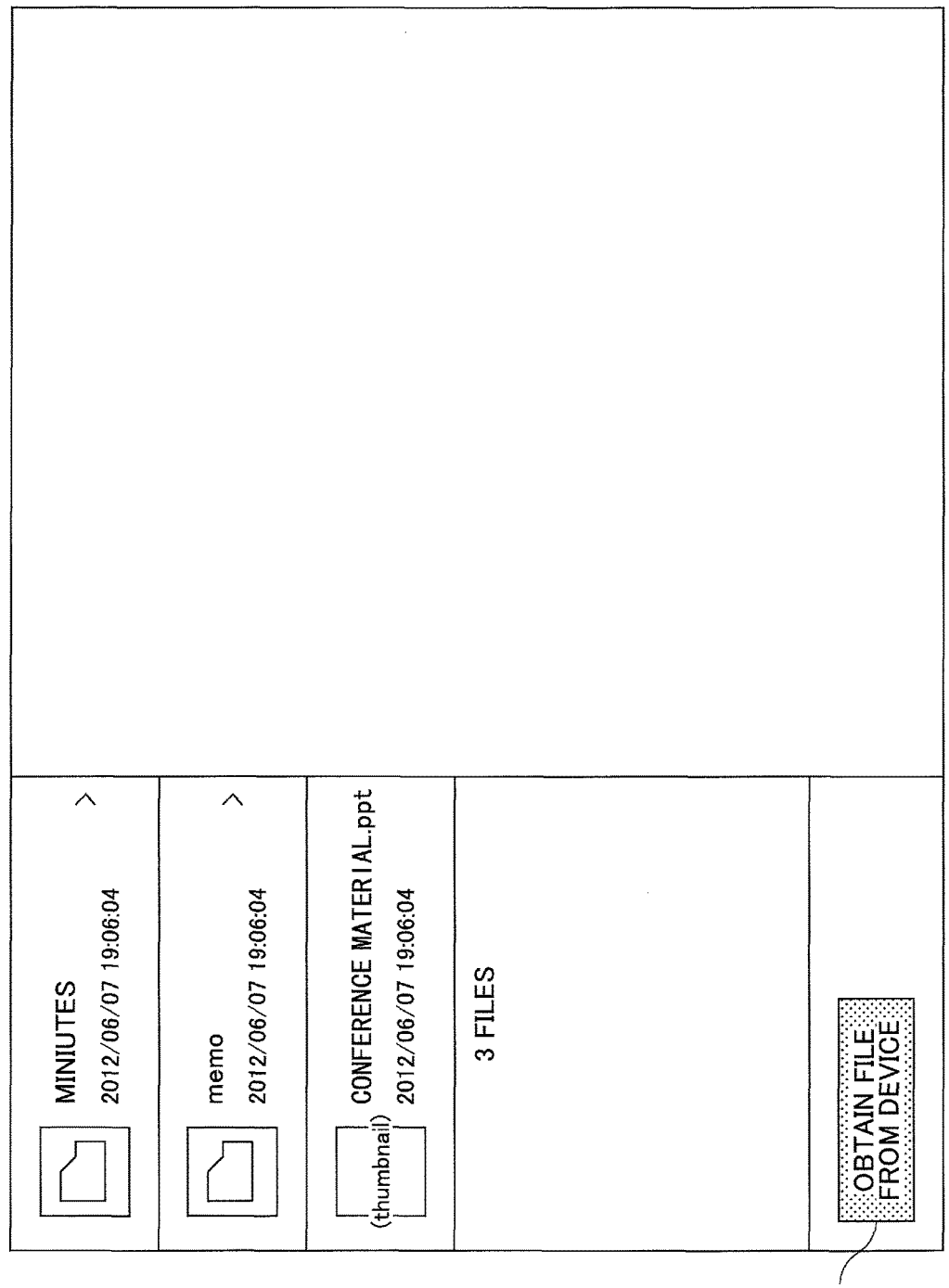
FIG. 18 is an image view of an example of a file obtainment screen in a state where a button cannot be selected to transition to an electronic device selection screen.

If the connection is not confirmed with the electronic device, the screen control unit 44 displays a button 1011 on a file display screen as in FIG. 18 in a state where the button cannot be selected to transition to an electronic device selection screen.

Figure 19:
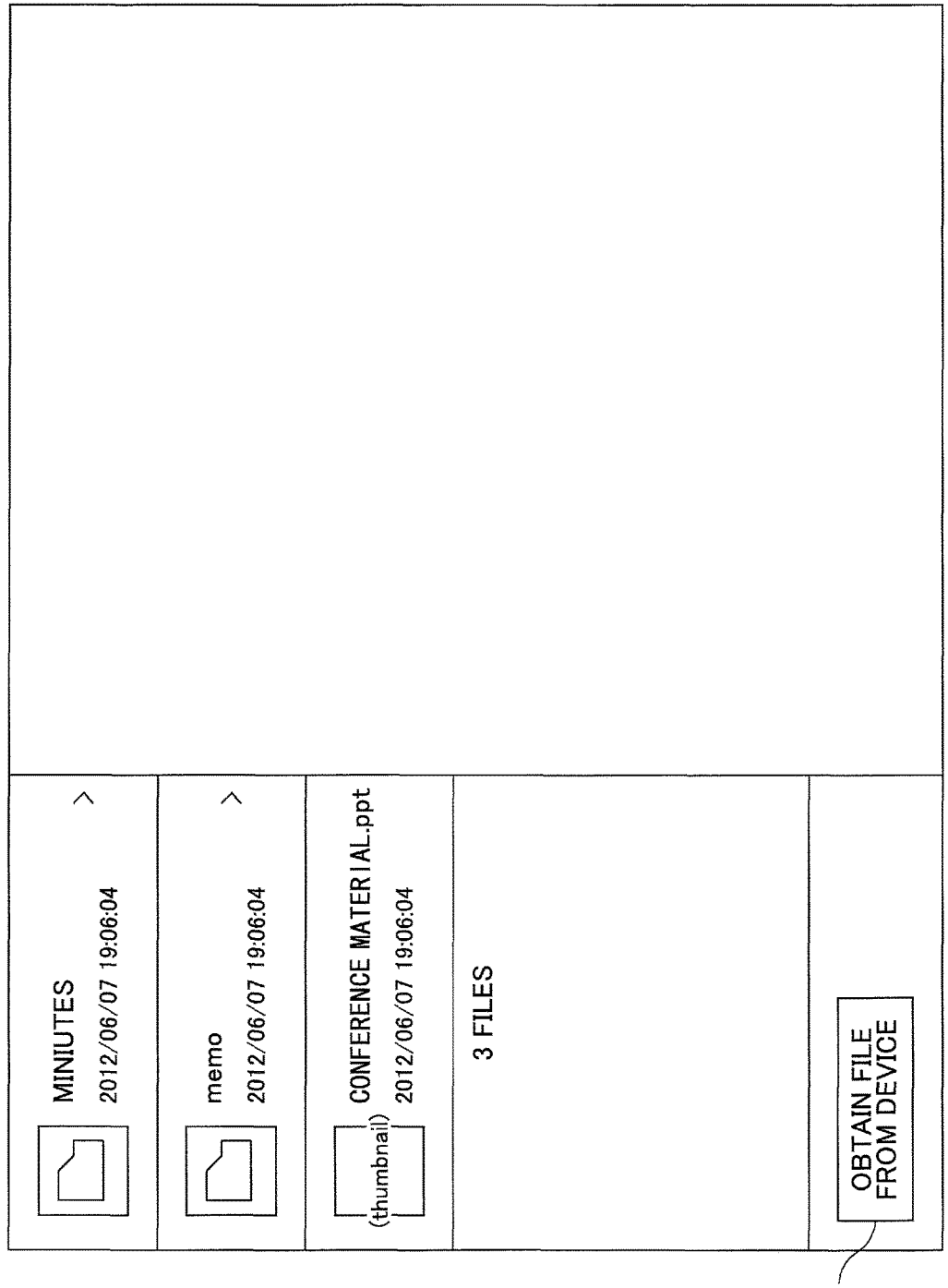
FIG. 19 is an image view of an example of a file obtainment screen in a state where a button can be selected to transition to an electronic device selection screen.

If the connection is confirmed with the electronic device, the screen control unit 44 displays the button 1011 on the file display screen as in FIG. 19 in a state where the button can be selected to transition to an electronic device selection screen.

FIG. 18 is an image view of an example of the file obtainment screen in a state where the button cannot be selected to transition to an electronic device selection screen. FIG. 19 is an image view of an example of the file obtainment screen in a state where the button can be selected to transition to an electronic device selection screen.

For example, the screen control unit 44 of the smart phone 11 displays the file obtainment screen as in FIG. 18 until the connection is confirmed with the electronic device by the connection confirmation request at Step S12. Having confirmed the connection with the electronic device, the screen control unit 44 displays the file obtainment screen in FIG. 19 in which the button 1011 to transition to an electronic device selection screen are updated from the non-selectable state to the selectable state.

Figure 20:
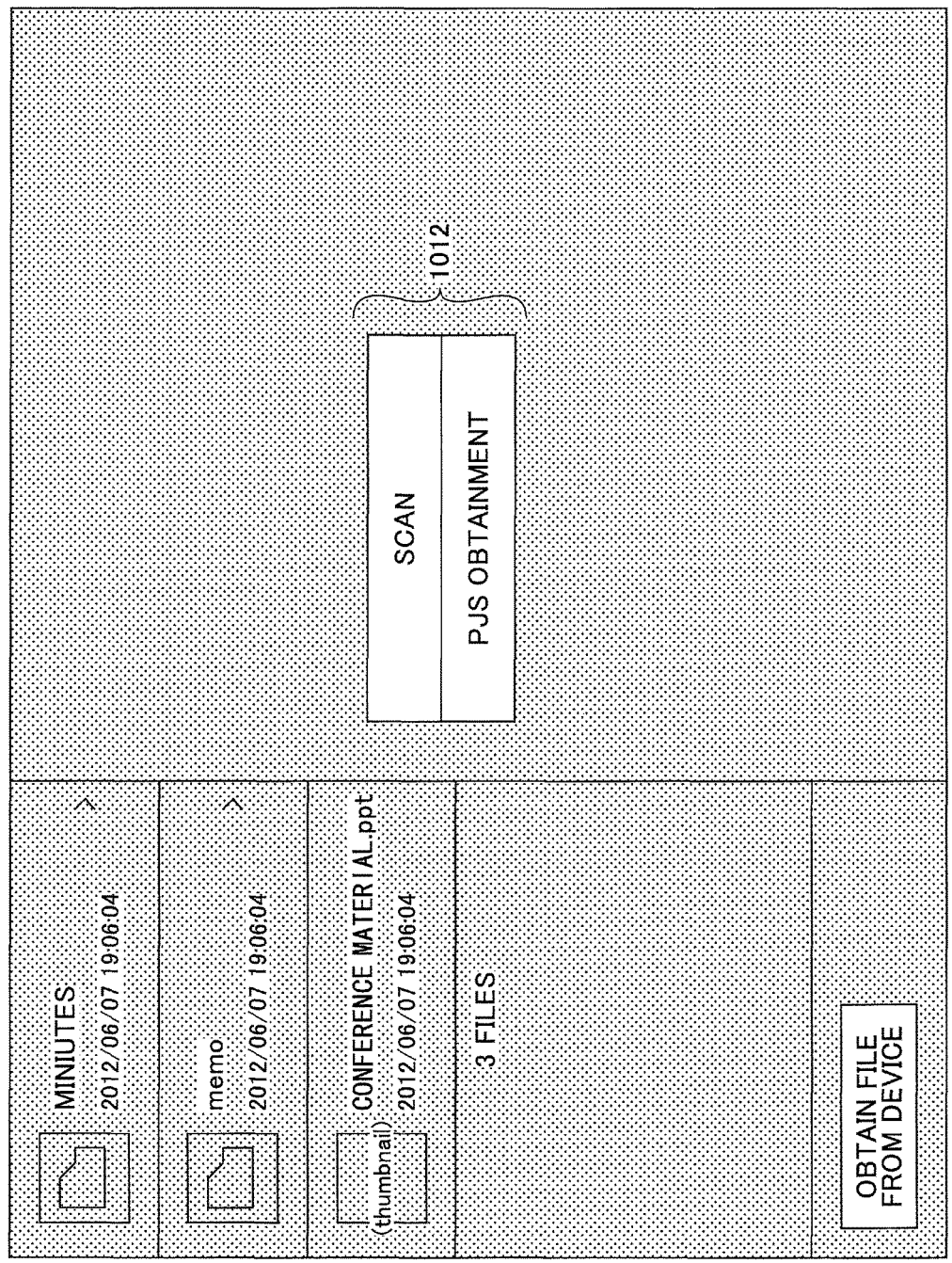
FIG. 20 is a diagram of an image view of an example an electronic device selection screen.

A user can have an electronic device selection screen displayed as in FIG. 20, by pressing the button 1011 in FIG. 19 to transition to the electronic device selection screen. FIG. 20 is an image view of an example of the electronic device selection screen. The electronic device selection screen in FIG. 20 shows a list 1012 of obtainment types of the electronic device with which the connection is confirmed.

The screen control unit 44 refers to a table as illustrated in FIG. 21, and displays the obtainment types having associated with the device type of the electronic device with which the connection is confirmed, as buttons in the list 1012. FIG. 21 is a configuration diagram of an example of the table to associate a device type, an output type, and an obtainment type of an electronic device with each other.

The device type is the same as a device type included in the device information that represents the type of an electronic device such as the projector 12. The output type represents a form of output by an electronic device such as projecting by a projector, displaying on an IWB, and printing. The obtainment type represents a form of obtainment by an electronic device such as PJS obtainment, IWB obtainment, and scanning.

By referring to the table as illustrated in FIG. 21, the screen control unit 44 can have a button, which corresponds to an output type of an electronic device with which the connection is confirmed, included in the buttons 1001 to make a request for outputting a file on the electronic device, as shown on the file display screen illustrated in FIG. 14 or FIG. 15.

Also, by referring to the table as illustrated in FIG. 21, the screen control unit 44 can have a button, which corresponds to an obtainment type of an electronic device with which the connection is confirmed, included in the list 1012 on the electronic device selection screen as illustrated in FIG. 20.

A user can make a request for obtaining a file by pressing a "PJS obtainment" button included in the list 1012. If the "PJS obtainment" button included in the list 1012 is pressed, the file obtainment request unit 43 of the smart phone 11 obtains a file, for example, from the projector 12A.

At Step S42, the file obtainment request unit 43 of the smart phone 11 transmits a request for obtaining the file on the projector 12A to the relay server 19. The request for obtaining the file transmitted at Step S42 is configured, for example, as illustrated in FIG. 12.

At Step S43, the information accumulation device 10 transmits a request for obtaining a request to the relay server 19. At Step S44, the information accumulation device 10 obtains the request for obtaining the file in FIG. 12 from the relay server 19.

At Step S45, based on the obtained request for obtaining the file in FIG. 12, the information accumulation device 10 has the projector 12A, specified by the device connection information, execute obtaining the file depending on the request command. Note that the file obtainment process executed by the information accumulation device 10 and the projector 12A at Step S45 will be described in detail later.

At Step S46, the information accumulation device 10 returns a file obtainment result from the projector 12A to the relay server 19 as a response to the request at Step S44. Also, at Step S47, the relay server 19 returns the file obtainment result from the information accumulation device 10 to the smart phone 11 as a response to the request at Step S42.

Figure 22:
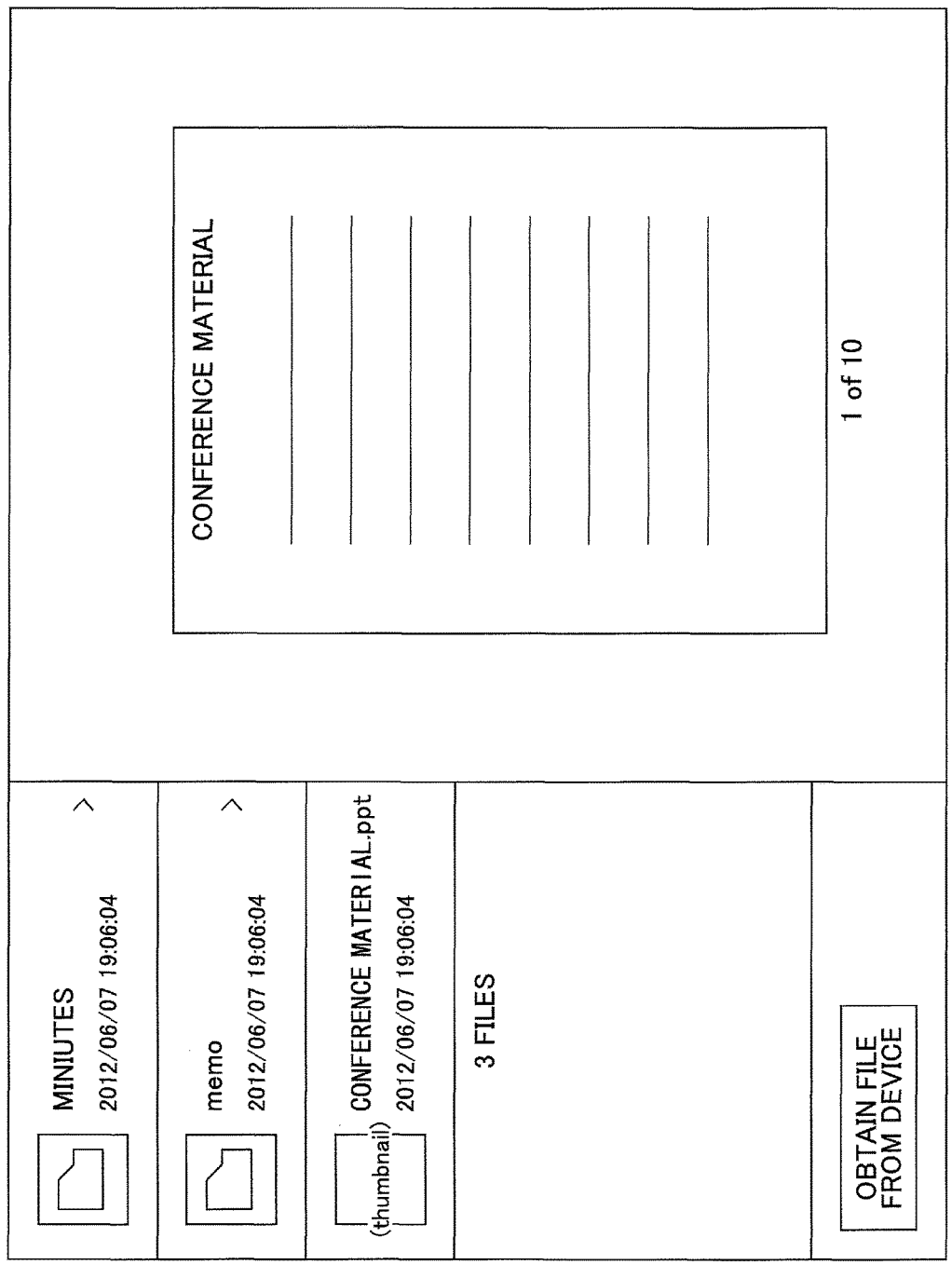
FIG. 22 is an image view of an example of a file obtainment screen that shows an obtained file.

Having obtained the file obtainment result from the relay server 19, the screen control unit 44 of the smart phone 11 displays the obtained file on the file obtainment screen as illustrated in FIG. 22. FIG. 22 is an image view of an example of the file obtainment screen that shows the obtained file.

Figure 23:
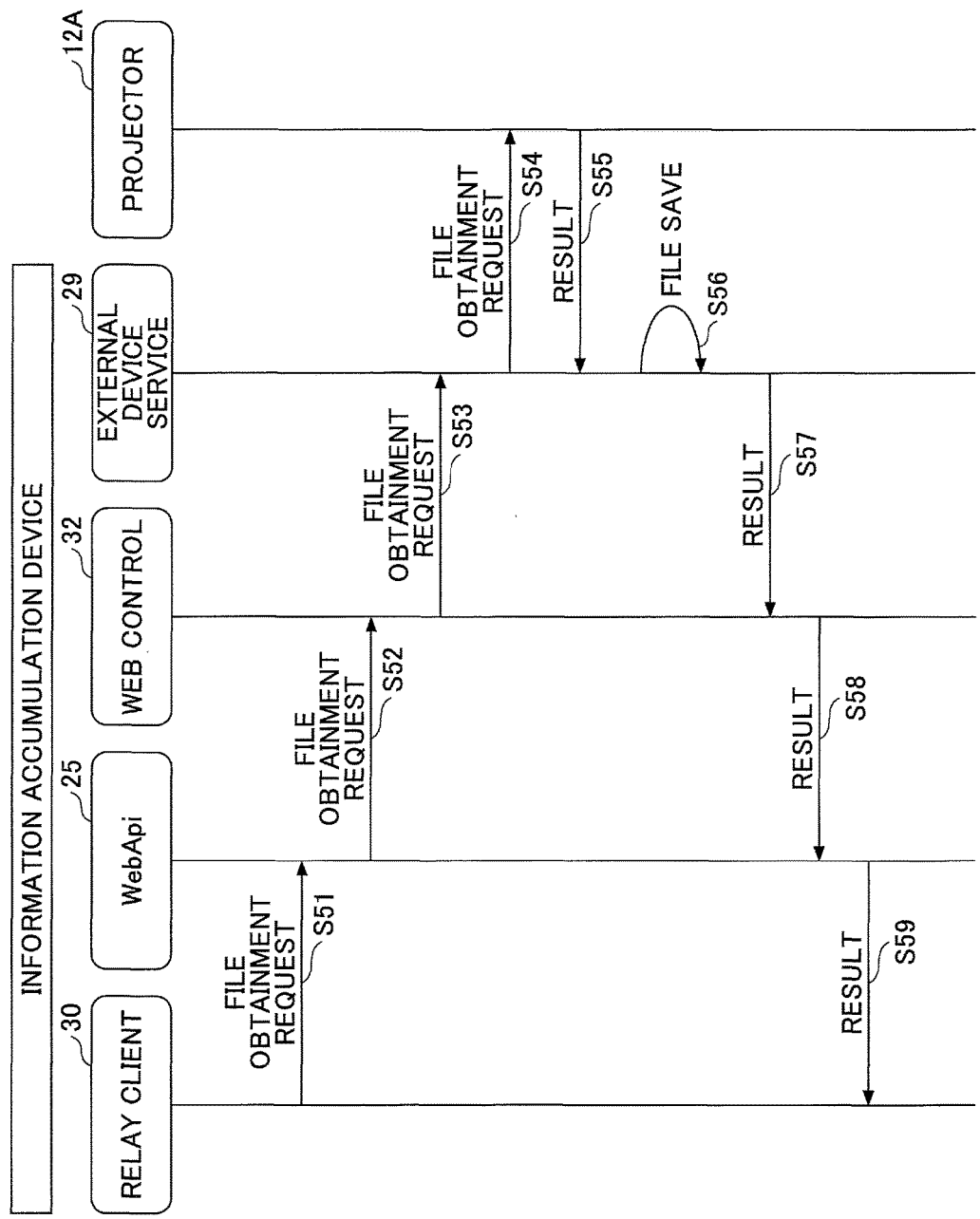
FIG. 23 is a sequence chart of an example of a file obtainment process executed by an information accumulation device and a projector.

The file obtainment process executed by the information accumulation device 10 and the projector 12A at Step S45 is executed, for example, as illustrated in FIG. 23. FIG. 23 is a sequence chart of an example of the file obtainment process executed by the information accumulation device 10 and the projector 12A.

The relay client 30 of the information accumulation device 10 obtains a request for obtaining a file from the relay server 19. At Step S51, the relay client 30 transfers the obtained request for obtaining the file to the Web API 25. At Step S52, the Web API 25 transfers the obtained request for obtaining the file to the Web control 32. At Step S53, the Web control 32 transfers the obtained request for obtaining the file to the external device service 29.

At Step S54, based on the transferred request for outputting the file, the external device service 29 makes the request for obtaining the file to the projector 12A. The projector 12A executes a file obtainment process. The projector 12A returns the file obtained by the file obtainment process to the external device service 29.

At Step S55, the external device service 29 receives the obtained result from the projector 12A. If the file is obtained normally, the external device service 29 executes a file save process at Step S56. The file save process at Step S56 is a process to save the obtained file in the shared folder 27.

At Step S57, the external device service 29 returns the obtained result of the file to the Web control 32 as a response to the request at Step S53. At Step S58, the Web control 32 returns the obtained result of the file from the external device service 29 to the Web API 25 as a response to the request at Step S52. At Step S59, the Web API 25 returns the obtained result of the file from the Web control 32 to the relay client 30 as a response to the request at Step S51.

In this way, in the cooperative processing system 1 in the present embodiment, if a user enters the conference room A while holding the smart phone 11 that cannot be connected with the network N3 having an electronic device such as the projector 12A connected, the user can control the electronic device from the smart phone 11.

Therefore, the user can have the smart phone 11 obtain a file output (projected) by the projector 12A, obtain a file output (displayed) by the IWB 13A, and obtain a file output (scanned) by the MFP 14A.

<<File Output and Obtainment Process>>

In the following, a file output process followed by a file obtainment process in the cooperative processing system 1 will be described as an example. A file output process followed by a file obtainment process in the cooperative processing system 1a is the same except for a step to obtain the device information.

Figure 24:
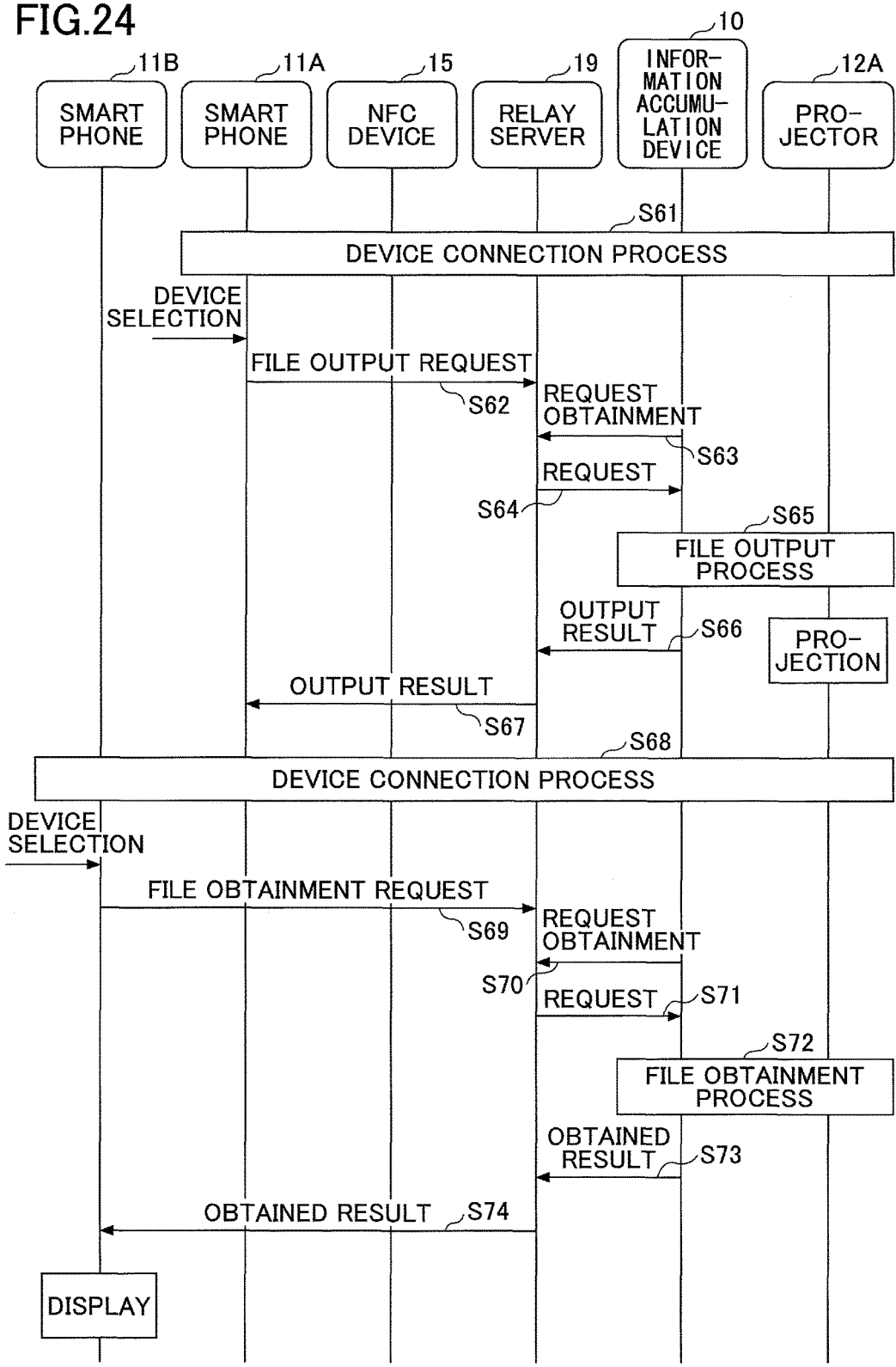
FIG. 24 is a sequence chart of an example of a file output process and a file obtainment process in a cooperative processing system according to an embodiment of the present invention.

FIG. 24 is a sequence chart of an example of a file output process and a file obtainment process in the cooperative processing system 1 according to the present embodiment. Since the sequence chart in FIG. 24 includes duplicated parts that have appeared in the sequence charts in FIG. 11 and FIG. 17, the description is omitted appropriately.

FIG. 24 illustrates a process where the smart phone 11A having connected with the network N1 has the projector 12A output a file, followed by a process where the smart phone 11B having connected with the network N1 obtains the file from the projector 12A.

At Step S61, the device information obtainment unit 41 of the smart phone 11A obtains the device information illustrated in FIG. 8 from the NFC device 15A. Then, the smart phone 11A executes a device connection process as described earlier. A file display screen is shown on the smart phone 11A as illustrated in FIG. 14.

The user can select the projector 12A as an electronic device on which a request for outputting a file is executed, by pressing a "project by projection" button included in the buttons 1001 to make a request for outputting a file on the electronic device shown on the file display screen in FIG. 14.

At Step S62, the file output request unit 42 of the smart phone 11A transmits the request for outputting the file on the projector 12A to the relay server 19. The request for outputting the file transmitted at Step S62 is configured, for example, as illustrated in FIG. 12, further including file and output settings.

At Step S63, the information accumulation device 10 transmits a request for obtaining a request to the relay server 19. At Step S64, the information accumulation device 10 obtains the request for outputting the file from the relay server 19. Note that if multiple information accumulation devices 10 use the relay server 19 that receives requests for obtaining a request, an information accumulation device 10 can receive a request for obtaining a request addressed to itself by having the request for obtaining a request include the information accumulation device ID of its own.

At Step S65, based on the obtained request for outputting the file, the information accumulation device 10 has the projector 12A, specified by the device connection information, execute outputting the file depending on the request command. The projector 12A starts outputting (projecting) the file included in the request for outputting the file.

At Step S66, the information accumulation device 10 returns an output result obtained from the projector 12A to the relay server 19 as a response to the request at Step S64. Also, at Step S67, the relay server 19 returns an output result obtained from the information accumulation device 10 to the smart phone 11 as a response to the request at Step S62.

Next, an example will be described in which after the projector 12A starts outputting (projecting) the file, a user holding the smart phone 11B obtains the file output by the projector 12A.

At Step S68, the device information obtainment unit 41 of the smart phone 11B obtains the device information illustrated in FIG. 8 from the NFC device 15A. Then, the smart phone 11B executes a device connection process as described earlier. An electronic device selection screen illustrated in FIG. 20 is displayed on the smart phone 11B.

The user can select the projector 12A as an electronic device on which a request for obtaining a file is to be executed, for example, by pressing a "PJS obtainment button" included in the list 1012 shown on the file display screen in FIG. 20.

At Step S69, the file obtainment request unit 43 of the smart phone 11B transmits a request for obtaining a file on the projector 12A to the relay server 19. The request for obtaining the file transmitted at Step S69 is configured, for example, as illustrated in FIG. 12, further including obtainment settings.

At Step S70, the information accumulation device 10 transmits a request for obtaining a request to the relay server 19. At Step S71, the information accumulation device 10 obtains the request for outputting the file from the relay server 19. At Step S72, based on the obtained request for obtaining the file, the information accumulation device 10 has the projector 12A, specified by the device connection information, execute obtaining the file depending on the request command.

If the file obtainment succeeds at Step S72, the information accumulation device 10 receives the file as a file obtainment result of the request for obtaining the file, back from the projector 12A. If the file obtainment fails, the information accumulation device 10 receives an error from the projector 12A.

At Step S73, the information accumulation device 10 returns the file obtainment result obtained from the projector 12A to the relay server 19 as a response to the request at Step S71. Also, at Step S74, the relay server 19 returns the file obtainment result obtained from the information accumulation device 10 to the smart phone 11B as a response to the request at Step S69.

Having obtained the file obtainment result from the relay server 19, the screen control unit 44 of the smart phone 11B displays the obtained file on the file obtainment screen as illustrated in FIG. 22. Note that if Step S72 is a step that takes a long time, Step S74 may not be executed as a response to the request at Step S69, but executed as a response to a request for obtaining the file obtainment result from the smart phone 11B.

In this way, in the cooperative processing system 1 in the present embodiment, a user(s) can control an electronic device from the smart phones 11A and 11B that cannot be connected with the network N3 having an electronic device such as the projector 12A connected.

For example, the cooperative processing system 1 in the present embodiment can have the projector 12A output (project) a file, have the IWB 13A output (display) a file, and have the MFP 14A output (print) a file, from the smart phone 11A.

Also, in the cooperative processing system 1 in the present embodiment, the smart phone 11B, which is different from the smart phone 11A, can obtain a file being output by the projector 12A, and can obtain a file being output by the IWB 13A. Also, the smart phone 11B can obtain a file scanned by the MFP 14A.

<<Log Saving>>

Figure 25:
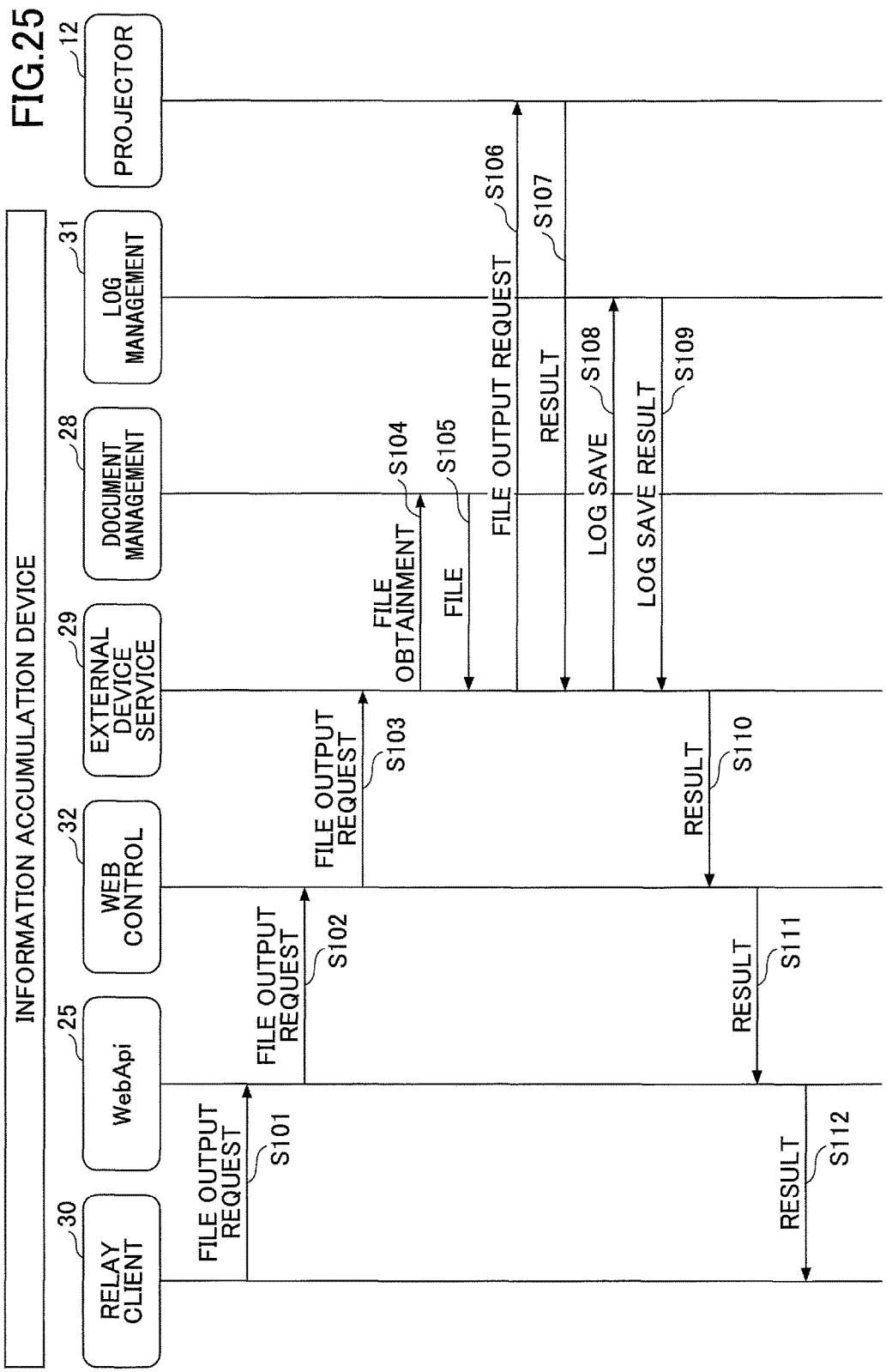
FIG. 25 is a sequence chart of another example of a file output process executed by an information accumulation device and a projector.

In the file output process illustrated in FIG. 11, the cooperative processing system 1 in the present embodiment may automatically save a log in the information accumulation device 10. If saving the log in the information accumulation device 10, Step S5 in FIG. 11 is processed as illustrated in FIG. 25. FIG. 25 is a sequence chart of another example of a file output process executed by the information accumulation device 10 and the projector 12.

The sequence chart in FIG. 25 has Steps S108 to S109 in addition to the steps in the sequence chart in FIG. 16. Having received an output result from the projector 12A at Step S107, at Step S108, the external device service 29 makes a request for log saving to the log management 31.

The log management 31 saves a log that includes user information of a user operating the smart phone 11, a request command included in a request for outputting a file, device connection information, date and time, an output result, and the like.

At Step S109, the log management 31 returns a result of the log saving to the external device service 29. In this way, the cooperative processing system 1 in the present embodiment has the information accumulation device 10 automatically save the log of a file output process.

Figure 26:
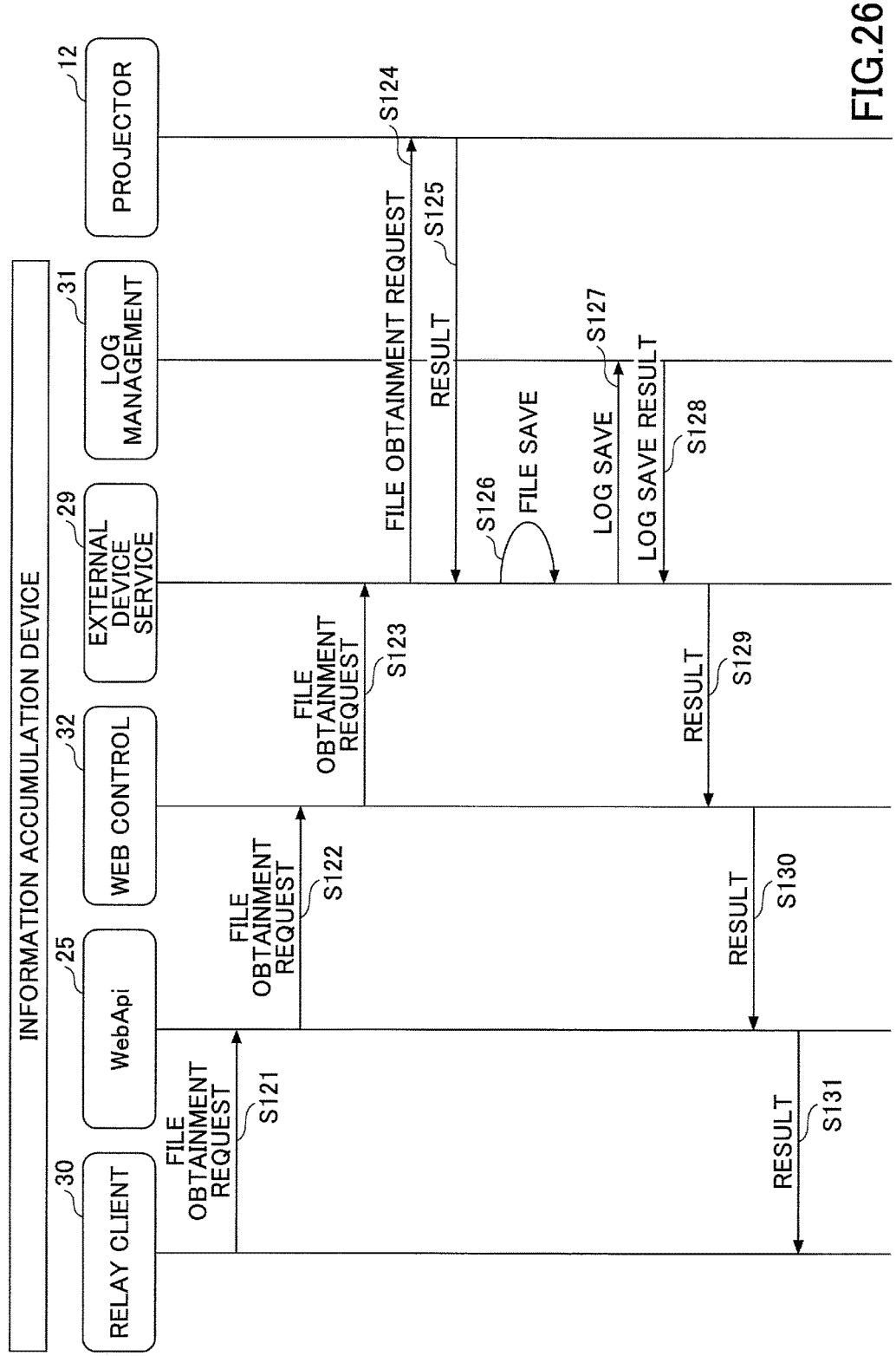
FIG. 26 is a sequence chart of another example of a file obtainment process executed by an information accumulation device and a projector.

In the file obtainment process illustrated in FIG. 17, the cooperative processing system 1 in the present embodiment may automatically save the log in the information accumulation device 10. If saving the log in the information accumulation device 10, Step S45 in FIG. 17 is processed as illustrated in FIG. 26. FIG. 26 is a sequence chart of another example of a file obtainment process executed by the information accumulation device 10 and the projector 12.

The sequence chart in FIG. 26 has Steps S127 to S128 in addition to the steps in the sequence chart in FIG. 23. Having executed a file save process at Step S126, at Step S127, the external device service 29 makes a request for log saving to the log management 31.

The log management 31 saves a log that includes user information of a user operating the smart phone 11, a request command included in a request for outputting a file, device connection information, date and time, an output result, and the like. At Step S128, the log management 31 returns a result of the log saving to the external device service 29. In this way, the cooperative processing system 1 in the present embodiment has the information accumulation device 10 automatically save the log of a file output process.

Note that the log saved by the log management 31 may be provided for a user by using the Web UI 24, or may be provided for a user by using the shared folder 27. In this way, if an electronic device is controlled from the smart phone 11, the cooperative processing system 1 in the present embodiment can save the log, and hence, monitoring becomes easier for an administrator.

<<Restriction on File Obtainment Process>>

If the cooperative processing system 1 in the present embodiment has the IWB 13A display a file upon a request from the smart phone 11A, and the smart phone 11B can obtain the file unconditionally, it could be a security problem.

Thereupon, if having an electronic device display a file of which the access right is given only to the user of the smart phone 11A, the cooperative processing system 1 in the present embodiment automatically inhibits other users from obtaining the file.

For example, at Step S24 in FIG. 16, the external device service 29 has the document management 28 confirm the access right of a file relating to a request for obtaining the file. If the access right is given only to the user who has made the request for outputting the file, the external device service 29 transmits, at Step S26, the request for outputting the file, and information about inhibiting the other users from obtaining the file, to the projector 12A. Having received the information about inhibiting the other users from obtaining the file, the projector 12A does not provide the file when receiving a request for obtaining the file by the other user, but returns an error. Note that if the user of the smart phone 11A transmits a parameter to explicitly permit another user to obtain the file, the projector 12A provides the file without returning an error.

In this way, if having an electronic device such as the IWB 13A display a file that should not be obtained by the other users, the cooperative processing system 1 in the present embodiment can inhibit the other users from obtaining the file.

<<Displaying User Having Executed File Obtainment>>

In the cooperative processing system 1 in the present embodiment, a file displayed on, for example, the IWB 13A upon a request by a user can be obtained from the IWB 13A by another user. However, the user having the IWB 13A display the file does not know who has obtained the file. Thereupon, the cooperative processing system 1 in the present embodiment has the IWB 13A display information about a user who has obtained a file so that the user who has obtained the file can be confirmed.

For example, at Step S54 in FIG. 23, the external device service 29 adds user information into a request for obtaining a file. The projector 12A executes a process to display the user information included in the file obtainment request.

In this way, in the cooperative processing system 1 in the present embodiment, a user can confirm that another user has obtained a file as intended, confirm that an unintended user does not obtain a file, and confirm who has obtained the file.

<<Saving Additional Information>>

In the cooperative processing system 1 in the present embodiment, depending on an electronic device outputting a file, various information may be added by hand-writing or the like. A user may want to save the information added in this way in the information accumulation device 10. Thereupon, after having an electronic device output a file, the cooperative processing system 1 in the present embodiment automatically saves the output contents having the additional information added at predetermined intervals.

For example, after having made a request for outputting a file at Step S26 in FIG. 16, the external device service 29 can obtain the output contents having the additional information added from the projector 12A, by making a request for obtaining a file on the projector 12A at predetermined intervals. For example, in a conference, output contents having additional information added is a snapshot of discussion contents, and hence, can be used for the minutes.

<Summary>

Thus, according to the cooperative processing system 1 in the embodiments, a user can control an electronic device from the smart phone 11 that cannot be connected with the network N3, such as an intranet, having the electronic device such as the projector 12A connected, via the network N1 such as a telephone communication channel.

Also, according to the cooperative processing system 1 in the embodiments, by having the NFC device 15, disposed around an electronic device such as the projector 12, obtain the device information to be transmitted to the smart phone 11, a user can save the trouble of inputting the device information into the smart phone 11.

In this way, in the cooperative processing system 1 in the present embodiment if a user holding the smart phone 11 approaches the neighborhood of an electronic device, the smart phone 11 obtains the device information of the electronic device by NFC communication. Therefore, by using the obtained device information of the electronic device, the smart phone 11 can control the electronic device via the relay server 19 and the information accumulation device 10.

Further, the present invention is not limited to the embodiments specifically disclosed above, but various variations and modifications may be made without departing from the scope of the present invention. A first network described in the claims corresponds to the network N1. A second network corresponds to the network N3. A terminal corresponds to the smart phone 11. An information processing apparatus corresponds to the information accumulation device 10. An information processing system corresponds to the cooperative processing system 1. An electronic device corresponds to the projector 12 or the like. A relay device corresponds to the relay server 19. A device information storage device corresponds to the NFC device 15 or the like. A room corresponds to the conference room.

A device information obtainment unit corresponds to the device information obtainment unit 41. A reception unit corresponds to the operation reception unit 45. An output request unit corresponds to the file output request unit 42. An obtainment request unit corresponds to the file obtainment request unit 43. A request obtainment unit and an electronic data providing unit correspond to the relay client 30. An electronic device request unit corresponds to the external device service 29. A log management unit corresponds to the log management 31. An electronic device capable of adding information to the electronic data being output, corresponds to the IWB 13.

RELATED-ART DOCUMENTS

Patent Documents

[Patent Document 1] Japanese Laid-open Patent Publication No. 2004-96591

The present application is based on and claims the benefit of priority of Japanese Priority Application No. 2014-177891 filed on Sep. 2, 2014, with the Japanese Patent Office, the entire contents of which are hereby incorporated by reference.

What is claimed is:

1. An information processing system, comprising:
   a plurality of terminals configured to be connected with a first network; and
   an information processing apparatus configured to be connected with a second network different from the first network,
   wherein a first terminal among the plurality of terminals includes
      a first device information obtainment unit configured to obtain device information of one or more electronic devices connected with the second network, from a device information storage device storing the device information of the one or more electronic devices,
      a first reception unit configured to receive from a user, a selection of one electronic device among the one or more electronic devices whose device information has been obtained,
      an output request unit configured to transmit, by using the device information of the one electronic device having been selected by the user, a request for outputting electronic data on the one electronic device, to the information processing apparatus, via a relay device connected with the first terminal and the information processing apparatus, wherein a second terminal among the plurality of terminals includes a second device information obtainment unit configured to obtain the device information of the one or more electronic devices, from the device information storage device, a second reception unit configured to receive from the user, a selection of the one electronic device outputting the electronic data based on the request for outputting, among the one or more electronic devices whose device information has been obtained, an obtainment request unit configured to transmit, by using the device information of the one electronic device having been selected by the user, a request for obtaining electronic data on the one electronic device, to the information processing apparatus, via the relay device connected with the second terminal and the information processing apparatus, and to obtain the electronic data output by the one electronic device, via the relay device, wherein the information processing apparatus includes a request obtainment unit configured to obtain from the relay device, the request for outputting the electronic data on the one electronic device, and the request for obtaining the electronic data on the one electronic device, an electronic device request unit configured to request the one electronic device to execute outputting the electronic data, based on the obtained request for outputting the electronic data on the one electronic device, to request the one electronic device to execute providing the electronic data output by the one electronic device, based on the obtained request for obtaining the electronic data on the one electronic device, and to receive the electronic data provided by the one electronic device, and an electronic data providing unit configured to provide the received electronic data provided by the one electronic device, to the second terminal, wherein when the one electronic device is an electronic device capable of adding information to the electronic data being output, the electronic device request unit requests the one electronic device to execute providing contents output by the one electronic device at predetermined intervals, and stores the contents output by the one electronic device, and provided by the one electronic device.

2. The information processing system, as claimed in claim 1, wherein the device information storage device stores, as the device information of the one or more electronic devices connected with the second network, information to identify each of the one or more electronic devices, and information to connect with said each of the one or more electronic devices via the first network.

3. The information processing system, as claimed in claim 1, wherein the device information storage device provides the device information of the one or more electronic devices, to the first terminal and the second terminal by near-field communication.

4. The information processing system, as claimed in claim 1, wherein the device information storage device is installed in each room where the one or more electronic devices are installed.

5. The information processing system, as claimed in claim 1, wherein the device information storage device is attached to each of the one or more electronic devices.

6. The information processing system, as claimed in claim 1, wherein the information processing apparatus further includes a log management unit configured to store, after having requested the one electronic device to execute outputting the electronic data, based on the obtained request for outputting the electronic data on the one electronic device, log information of the request.

7. The information processing system, as claimed in claim 1, wherein the information processing apparatus further includes a log management unit configured to store, after having requested the one electronic device to execute providing the electronic data output by the one electronic device, based on the obtained request for obtaining the electronic data on the one electronic device, log information of the request.

8. The information processing system, as claimed in claim 1, wherein when the electronic device request unit has requested, based on the obtained request for outputting the electronic data on the one electronic device, the one electronic device to execute outputting the electronic data, the electronic device request unit inhibits itself, depending on a right to access the electronic data, from providing the electronic data output by the one electronic device, based on the obtained request for obtaining the electronic data on the one electronic device.

9. The information processing system, as claimed in claim 1, wherein when the electronic device request unit requests, based on the obtained request for obtaining the electronic data on the one electronic device, the one electronic device to execute providing the electronic data output by the one electronic device, the electronic device request unit adds user information of the second terminal into the request to make the request, and has the one electronic device output the user information of the second terminal.

10. The information processing system, as claimed in claim 1, wherein in response to a request from the information processing apparatus, the relay device provides the request for outputting the electronic data on the one electronic device, and the request for obtaining the electronic data on the one electronic device, to the information processing apparatus.

11. An information processing apparatus, connected with a second network different from a first network having a plurality of terminals connected, a first terminal among the plurality of terminals, including a first device information obtainment unit configured to obtain device information of one or more electronic devices connected with the second network, from a device information storage device storing the device information of the one or more electronic devices, a first reception unit configured to receive from a user, a selection of one electronic device among the one or more electronic devices whose device information has been obtained, and an output request unit configured to transmit, by using the device information of the one electronic device having been selected by the user, a request for outputting electronic data on the one electronic device, to the information processing apparatus, via a relay device connected with the first terminal and the information processing apparatus, and a second terminal among the plurality of terminals, including a second device information obtainment unit configured to obtain the device information of the one or more electronic devices, from the device information storage device, a second reception unit configured to receive from the user, a selection of the one electronic device outputting the electronic data based on the request for outputting, among the one or more electronic devices whose device information has been obtained, and an obtainment request unit configured to transmit, by using the device information of the one electronic device having been selected by the user, a request for obtaining electronic data on the one electronic device, to the information processing apparatus, via the relay device connected with the second terminal and the information processing apparatus, and to obtain the electronic data output by the one electronic device, via the relay device, the information processing apparatus, comprising:

a request obtainment unit configured to obtain from the relay device, the request for outputting the electronic data on the one electronic device, and the request for obtaining the electronic data on the one electronic device;

an electronic device request unit configured to request the one electronic device to execute outputting the electronic data, based on the obtained request for outputting the electronic data on the one electronic device, to request the one electronic device to execute providing the electronic data output by the one electronic device, based on the obtained request for obtaining the electronic data on the one electronic device, and to receive the electronic data provided by the one electronic device; and an electronic data providing unit configured to provide the received electronic data provided by the one electronic device, to the second terminal, wherein when the one electronic device is an electronic device capable of adding information to the electronic data being output, the electronic device request unit requests the one electronic device to execute providing contents output by the one electronic device at predetermined intervals, and stores the contents output by the one electronic device, and provided by the one electronic device.

12. A non-transitory computer-readable recording medium having a program stored therein for causing an information processing apparatus, connected with a second network different from a first network having a plurality of terminals connected, to execute a process, in cooperation with a first terminal among the plurality of terminals, including a first device information obtainment unit configured to obtain device information of one or more electronic devices connected with the second network, from a device information storage device storing the device information of the one or more electronic devices, a first reception unit configured to receive from a user, a selection of one electronic device among the one or more electronic devices whose device information has been obtained, an output request unit configured to transmit, by using the device information of the one electronic device having been selected by the user, a request for outputting electronic data on the one electronic device, to the information processing apparatus, via a relay device connected with the first terminal and the information processing apparatus, and a second terminal among the plurality of terminals, including a second device information obtainment unit configured to obtain the device information of the one or more electronic devices, from the device information storage device, a second reception unit configured to receive from the user, a selection of the one electronic device outputting the electronic data based on the request for outputting, among the one or more electronic devices whose device information has been obtained, an obtainment request unit configured to transmit, by using the device information of the one electronic device having been selected by the user, a request for obtaining electronic data on the one electronic device, to the information processing apparatus, via the relay device connected with the second terminal and the information processing apparatus, and to obtain the electronic data output by the one electronic device, via the relay device, the process comprising:

obtaining from the relay device, the request for outputting the electronic data on the one electronic device, and the request for obtaining the electronic data on the one electronic device;

requesting the one electronic device to execute outputting the electronic data, based on the obtained request for outputting the electronic data on the one electronic device;

requesting the one electronic device to execute providing the electronic data output by the one electronic device, based on the obtained request for obtaining the electronic data on the one electronic device;

receiving the electronic data provided by the one electronic device; and providing the received electronic data provided by the one electronic device, to the second terminal, wherein when the one electronic device is an electronic device capable of adding information to the electronic data being output, the process further comprising requesting the one electronic device to execute providing contents output by the one electronic device at predetermined intervals, and storing the contents output by the one electronic device, and provided by the one electronic device.

* * * * *